US 6,718,064 B1

(12) United States Patent
Abe

(10) Patent No.: US 6,718,064 B1
(45) Date of Patent: Apr. 6, 2004

(54) IMAGE COMPRESSION AND EXPANSION APPARATUS

(75) Inventor: Nobuaki Abe, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/521,429

(22) Filed: Mar. 8, 2000

(30) Foreign Application Priority Data

Mar. 9, 1999 (JP) .......................... P11-062363

(51) Int. Cl.[7] .............................. G06K 9/36; G06K 9/46; G06K 9/32
(52) U.S. Cl. ........................ 382/232; 382/233; 382/250; 382/235
(58) Field of Search ................................ 282/232, 233, 282/166, 235, 248, 240, 250, 236, 252, 293, 298–300; 375/240.01, 240.02, 240.2, 240.24, 240.25, 240.21, 240.18, 240.16, 240.17; 358/426.01, 539, 538; 348/390.1, 391.1, 396.1, 661, 663, 400.1, 401.1, 402.1, 409.1, 413.1, 415.1; 386/33

(56) References Cited

U.S. PATENT DOCUMENTS

| 4,903,317 | A | * | 2/1990 | Nishihara et al. ........... 382/233 |
| 5,138,672 | A | * | 8/1992 | Hirabayashi et al. ........ 382/298 |
| 5,168,375 | A | * | 12/1992 | Reisch et al. ................ 382/250 |
| 5,262,854 | A | * | 11/1993 | Ng .............................. 382/232 |
| 5,270,812 | A | * | 12/1993 | Richards .................... 382/232 |
| 5,309,524 | A | * | 5/1994 | Hirabayashi et al. ........ 382/298 |
| 5,414,469 | A | * | 5/1995 | Gonzales et al. ........... 348/408 |
| 5,428,397 | A | * | 6/1995 | Lee et al. ................... 348/448 |
| 5,805,737 | A | | 9/1998 | Abe |
| 5,845,015 | A | * | 12/1998 | Martucci .................... 382/250 |
| 5,937,098 | A | | 8/1999 | Abe |
| 6,005,982 | A | | 12/1999 | Abe |
| 6,023,301 | A | * | 2/2000 | Katata et al. .............. 348/586 |
| 6,157,749 | A | * | 12/2000 | Miyake ....................... 382/300 |
| 6,263,119 | B1 | * | 7/2001 | Martucci .................... 382/298 |

OTHER PUBLICATIONS

Huifang Sun (IEEE 1993), Hierarchical decoder for Mpeg compressed video data.*
Hsu et al. (IEEE 1998), Wavelet and lapped orthogonal transforms with overlapped motion–compensation for multiresolution coding of HDTV.*

* cited by examiner

Primary Examiner—Andrew W. Johns
Assistant Examiner—Amir Alavi
(74) Attorney, Agent, or Firm—Greenblum & Bernstein, P.L.C.

(57) ABSTRACT

An image compression and expansion apparatus obtains an average value of a single block (8×8 pixels) in a first matrix (64×64 pixels) of the original image data, to generate reduced image data of a second matrix (8×8 pixels). A sub-matrix, which is displaced from the second matrix by a predetermined amount, is obtained in such a manner that a pixel of the second matrix is contained in the sub-matrix. 8×8 pixels of the sub-matrix are subjected to a two dimensional discrete cosine transformation, to obtain reduced DCT coefficient data. The reduced DCT coefficient data is subjected to an expanded inverse discrete cosine transformation to obtain expanded image data of a matrix (64×64 pixels). The displacement direction and the displacement amount of the sub-matrix relative to the second matrix are selected in such a manner that the expanded image data becomes as close to the original image data as possible.

14 Claims, 19 Drawing Sheets

FIG. 7

| 179 | 180 | 183 | 186 | 190 | 193 | 195 | 195 | 193 | 189 |
|---|---|---|---|---|---|---|---|---|---|
| 176 | 178 | 181 | 184 | 188 | 191 | 194 | 194 | 193 |  |
| 172 | 173 | 176 | 180 | 184 | 188 | 192 | 193 | 192 |  |
| 165 | 167 | 170 | 174 | 179 | 184 | 188 | 191 | 191 |  |
| 156 | 158 | 162 | 167 | 173 | 179 | 184 | 188 | 190 |  |
| 146 | 148 | 153 | 159 | 165 | 172 | 179 | 184 |  |  |
| 136 | 138 | 143 | 149 | 157 | 165 | 172 | 179 |  |  |
| 124 | 127 | 132 | 139 | 147 | 156 | 165 | 173 |  |  |
| 113 | 116 | 121 | 129 |  |  |  |  |  |  |
| 103 |  |  |  |  |  |  |  |  |  |

M3

↑

| 1160 | -145 | 58 | 13 | 8 | -2 | -3 | 1 |
|---|---|---|---|---|---|---|---|
| 108 | -53 | -62 | -77 | 2 | -39 | -11 | -7 |
| 55 | 66 | 112 | 15 | -48 | -6 | -30 | -4 |
| -2 | -10 | 3 | 100 | 63 | -37 | -10 | -8 |
| 12 | 14 | -5 | -17 | 54 | 49 | -53 | 0 |
| -2 | 2 | -23 | 24 | -28 | 70 | -1 | -22 |
| 9 | 7 | 0 | 2 | 13 | -2 | 22 | 2 |
| -4 | 4 | -16 | 5 | -1 | 0 | -5 | 7 |

| 179 | 180 | 183 | 186 | 190 | 193 | 195 | 195 |
|-----|-----|-----|-----|-----|-----|-----|-----|
| 176 | 178 | 181 | 184 | 188 | 191 | 194 | 194 |
| 172 | 173 | 176 | 180 | 184 | 188 | 192 | 193 |
| 165 | 167 | 170 | 174 | 179 | 184 | 188 | 191 |
| 156 | 158 | 162 | 167 | 173 | 179 | 184 | 188 |
| 146 | 149 | 153 | 159 | 165 | 172 | 179 | 184 |
| 136 | 138 | 143 | 149 | 157 | 165 | 172 | 179 |
| 124 | 127 | 132 | 139 | 147 | 156 | 165 | 173 |

SHIFT(q,r)=(0,0)

FIG. 10B

| 162 | 171 | 179 | 186 | 190 | 192 | 191 | 188 |
|-----|-----|-----|-----|-----|-----|-----|-----|
| 154 | 165 | 174 | 182 | 188 | 192 | 194 | 192 |
| 146 | 158 | 168 | 178 | 186 | 191 | 194 | 195 |
| 138 | 150 | 161 | 172 | 181 | 188 | 193 | 196 |
| 130 | 142 | 153 | 165 | 175 | 184 | 190 | 194 |
| 121 | 133 | 145 | 157 | 168 | 177 | 186 | 191 |
| 113 | 124 | 136 | 147 | 159 | 170 | 179 | 186 |
| 105 | 115 | 126 | 138 | 149 | 161 | 171 | 180 |

SHIFT(q,r)=(−1,−1)

FIG. 10C

| 167 | 178 | 186 | 192 | 196 | 196 | 195 | 190 |
|-----|-----|-----|-----|-----|-----|-----|-----|
| 158 | 169 | 179 | 187 | 193 | 196 | 196 | 194 |
| 148 | 160 | 171 | 181 | 188 | 194 | 196 | 196 |
| 138 | 150 | 162 | 173 | 182 | 189 | 194 | 196 |
| 128 | 140 | 152 | 164 | 174 | 183 | 190 | 194 |
| 118 | 130 | 142 | 154 | 166 | 176 | 184 | 190 |
| 110 | 120 | 132 | 144 | 156 | 167 | 177 | 185 |
| 102 | 111 | 122 | 134 | 146 | 158 | 169 | 178 |

SHIFT(q,r)=(−4,−3)

FIG. 10D

| 191 | 190 | 188 | 186 | 184 | 180 |
|-----|-----|-----|-----|-----|-----|
| 191 | 190 | 189 | 188 | 186 | 186 | 184 | 180 |
| 183 | 183 | 184 | 185 | 186 | 186 | 185 | 183 |
| 174 | 175 | 177 | 179 | 182 | 184 | 186 | 186 |
| 165 | 167 | 170 | 174 | 178 | 183 | 186 | 188 |
| 157 | 159 | 163 | 168 | 174 | 181 | 186 | 190 |
| 150 | 152 | 157 | 164 | 171 | 179 | 186 | 191 |
| 145 | 148 | 153 | 160 | 169 | 178 | 186 | 192 |
| 142 | 145 | 151 | 158 | 167 | 177 | 186 | 193 |

SHIFT(q,r)=(0,−7)

FIG. 11

| DISP.AMOUNT | q=0 | q=-1 | q=-2 | q=-3 | q=-4 | q=-5 | q=-6 | q=-7 |
|---|---|---|---|---|---|---|---|---|
| r=0 | 24695 | 19634 | 19791 | 19838 | 19945 | 20571 | 21307 | 18639 |
| r=-1 | 29786 | 22531 | 22571 | 22900 | 23247 | 23982 | 24125 | 18852 |
| r=-2 | 29203 | 21273 | 21339 | 21658 | 22088 | 22654 | 22704 | 17325 |
| r=-3 | 28529 | 20139 | 20206 | 20617 | 20934 | 21767 | 21757 | 16654 |
| r=-4 | 28350 | 20047 | 20237 | 20540 | 20961 | 21764 | 21792 | 16669 |
| r=-5 | 28554 | 20210 | 20237 | 20600 | 21007 | 21852 | 21940 | 16723 |
| r=-6 | 28487 | 19979 | 20029 | 20381 | 20740 | 21644 | 21870 | 16918 |
| r=-7 | 37677 | 27089 | 27428 | 27860 | 27841 | 28150 | 27907 | 22170 |

FIG. 18A

| 186 | 188 | 192 | 197 | 202 | 207 | 210 | 211 |
|-----|-----|-----|-----|-----|-----|-----|-----|
| 182 | 184 | 188 | 194 | 200 | 205 | 209 | 210 |
| 175 | 177 | 182 | 188 | 194 | 201 | 205 | 208 |
| 164 | 167 | 172 | 179 | 187 | 194 | 200 | 204 |
| 151 | 154 | 160 | 168 | 177 | 186 | 194 | 200 |
| 136 | 139 | 146 | 154 | 165 | 175 | 185 | 194 |
| 119 | 123 | 130 | 140 | 151 | 164 | 176 | 186 |
| 102 | 106 | 113 | 124 | 137 | 151 | 165 | 177 |

SHIFT(q,r)=(0,0)

FIG. 18B

| 168 | 179 | 188 | 196 | 201 | 203 | 202 | 199 |
|-----|-----|-----|-----|-----|-----|-----|-----|
| 159 | 171 | 183 | 192 | 199 | 204 | 205 | 204 |
| 150 | 163 | 176 | 187 | 196 | 202 | 206 | 207 |
| 140 | 154 | 167 | 180 | 191 | 199 | 205 | 207 |
| 130 | 144 | 159 | 171 | 183 | 194 | 201 | 206 |
| 120 | 134 | 148 | 162 | 175 | 186 | 196 | 202 |
| 111 | 124 | 137 | 151 | 165 | 177 | 188 | 197 |
| 102 | 113 | 126 | 140 | 153 | 167 | 179 | 189 |

SHIFT(q,r)=(−1,−1)

FIG. 18C

| 174 | 185 | 194 | 201 | 205 | 206 | 204 | 199 |
|-----|-----|-----|-----|-----|-----|-----|-----|
| 164 | 176 | 187 | 196 | 202 | 205 | 206 | 203 |
| 153 | 166 | 178 | 189 | 197 | 203 | 205 | 205 |
| 142 | 155 | 168 | 180 | 190 | 198 | 203 | 205 |
| 131 | 144 | 157 | 170 | 182 | 191 | 199 | 203 |
| 121 | 133 | 146 | 159 | 172 | 183 | 192 | 199 |
| 101 | 123 | 135 | 148 | 161 | 174 | 184 | 193 |
| 102 | 113 | 125 | 137 | 151 | 163 | 175 | 186 |

SHIFT(q,r)=(−4,−3)

FIG. 18D

| 201 | 201 | 200 | 199 | 197 | 194 | 189 | 182 |
|-----|-----|-----|-----|-----|-----|-----|-----|
| 187 | 188 | 189 | 191 | 192 | 193 | 191 | 188 |
| 172 | 174 | 177 | 181 | 186 | 190 | 193 | 193 |
| 156 | 159 | 164 | 171 | 179 | 187 | 193 | 197 |
| 141 | 145 | 152 | 162 | 172 | 183 | 193 | 200 |
| 129 | 133 | 142 | 153 | 167 | 180 | 193 | 202 |
| 120 | 125 | 134 | 147 | 162 | 178 | 192 | 204 |
| 115 | 121 | 131 | 144 | 160 | 177 | 192 | 205 |

SHIFT(q,r)=(0,−7)

FIG. 19

| DISP.AMOUNT | q=0 | q=−1 | q=−2 | q=−3 | q=−4 | q=−5 | q=−6 | q=−7 |
|---|---|---|---|---|---|---|---|---|
| r=0 | 17954 (1.545) | 14990 (1.160) | 15134 (1.132) | 15144 (1.146) | 15264 (1.145) | 15172 (1.204) | 14492 (1.264) | 13803 (1.128) |
| r=−1 | 24789 (1.466) | 17988 (1.170) | 18184 (1.142) | 18464 (1.155) | 18708 (1.150) | 18773 (1.201) | 17364 (1.270) | 13719 (1.183) |
| r=−2 | 26536 (1.308) | 17363 (1.126) | 17695 (1.101) | 17950 (1.111) | 18179 (1.106) | 18562 (1.149) | 17419 (1.208) | 13150 (1.132) |
| r=−3 | 26469 (1.248) | 16677 (1.108) | 16808 (1.087) | 17090 (1.096) | 17357 (1.092) | 17572 (1.132) | 16709 (1.184) | 12924 (1.103) |
| r=−4 | 26332 (1.272) | 16575 (1.119) | 16784 (1.097) | 16863 (1.108) | 17168 (1.103) | 17535 (1.145) | 16593 (1.199) | 12935 (1.112) |
| r=−5 | 26328 (1.262) | 16633 (1.111) | 16850 (1.087) | 17072 (1.097) | 17265 (1.093) | 17684 (1.133) | 16725 (1.185) | 12937 (1.105) |
| r=−6 | 26017 (1.260) | 16382 (1.110) | 16633 (1.083) | 16959 (1.092) | 17016 (1.088) | 17490 (1.126) | 16632 (1.173) | 13129 (1.095) |
| r=−7 | 30190 (1.768) | 25440 (1.174) | 25970 (1.128) | 26329 (1.136) | 26487 (1.135) | 26102 (1.207) | 24257 (1.296) | 20196 (1.179) |

…

IMAGE COMPRESSION AND EXPANSION APPARATUS

BACKGROUND OF THE INVENTION

1. Field of the Invention

The present invention relates to an image compression and expansion apparatus for recording image data obtained by reducing the number of pixels of an original still image onto a recording medium and later reading the image data from the recording medium and restoring the original image.

2. Description of the Related Art

In the past, as an example of image compression processing in an image compression and expansion apparatus, it has been known to find an average value of a predetermined number of pixel values included in the large number of pixels forming an original image, to generate a single pixel and to record a reduced image comprised of such pixels on to a recording medium. Further, in the image expansion processing in the image compression and expansion apparatus, the reduced image read from the recording medium is subject to interpolation so as to generate an enlarged image of the same number of pixels as the original image.

On the other hand, another image compression and expansion apparatus is known to record DCT coefficients obtained by application of a two dimensional discrete cosine transformation to a reduced image onto a recording medium and applying a two dimensional inverse discrete cosine transformation to the DCT coefficients read from the recording medium to obtain IDCT coefficients. The IDCT coefficients correspond to part of the pixels contained in the pixels of the original image. By applying interpolation to the IDCT coefficients, it is possible to generate an enlarged image of the same number of pixels as the original image.

The enlarged image reproduced by an image compression and expansion apparatus should ideally match the original image, but since part of the information included in the original image is lost at the time of generating the reduced image, normally the original image is not matched and the quality of the image becomes relatively poor.

SUMMARY OF THE INVENTION

An object of the present invention is to provide an image compression and expansion apparatus for reproducing an expanded image corresponding to an original image from a reduced image, which can improve the quality of the expanded image.

According to a first aspect of the present invention, there is provided an image compression apparatus comprising a reduced image generating processor, a reduced image area setting processor, a first orthogonal transforming processor, a first expanded image generating processor, an evaluation function calculating processor and a displacement-amount selecting processor.

The reduced image generating processor generates, based on original image data arranged in a first matrix comprised of a plurality of pixels, reduced image data arranged in a second matrix comprised of a smaller number of pixels than the first matrix. The reduced image area setting processor sets a reduced image area, which is defined by a sub-matrix, obtained by displacing the second matrix in a predetermined direction by a predetermined amount, and contains an objective pixel also contained in the reduced image data. The first orthogonal transforming processor applies orthogonal transformation to the reduced image data of the reduced image area to obtain reduced orthogonal transformation coefficient data. The first expanded image generating processor applies inverse orthogonal transformation to the reduced orthogonal transformation coefficient data to obtain expanded image data arranged in a third matrix comprised of a greater number of pixels than the second matrix. The evaluation function calculating processor calculates a value of an evaluation function, which corresponds to a difference between the original image data and the expanded image data. The displacement-amount selecting processor selects the displacement direction and amount of the reduced image area, for every objective pixel, in such a manner that the value of the evaluation function becomes a minimum.

According to a second aspect of the present invention, there is provided an image expansion apparatus for expanding reduced image data recorded in a recording medium by the image compression apparatus, described above as the first aspect, which further comprises a data reading processor, a reduced image area selecting processor, a second orthogonal transforming processor and a second expanded image generating processor.

The data reading processor reads the parameter and the reduced image data from the recording medium. The reduced image area selecting processor selects a reduced image area based on the displacement direction and amount, corresponding to the objective pixel included in the reduced image data. The second orthogonal transforming processor applies the orthogonal transformation to the reduced image data of the reduced image area selected by the reduced image area selecting processor, for every objective pixel, to obtain reduced orthogonal transformation coefficient data. The second expanded image generating processor applies inverse orthogonal transformation to the reduced orthogonal transformation coefficient data to obtain expanded image data arranged in a third matrix composed of a greater number of pixels than the second matrix.

According to a third aspect of the present invention, there is provided an image compression apparatus comprising a reduced image generating processor, a reduced image area setting processor, a first orthogonal transforming processor, a first expanded image generating processor, a contrast coefficient calculating processor, a contrast adjusting processor, an error evaluation function calculating processor and a displacement-amount selecting processor.

The reduced image generating processor generates, based on original image data arranged in a first matrix comprised of a plurality of pixels, reduced image data arranged in a second matrix comprised of a smaller number of pixels than the first matrix. The reduced image area setting processor sets a reduced image area, which is defined by a sub-matrix, obtained by displacing the second matrix in a predetermined direction, and contains an objective pixel also contained in the reduced image data. The first orthogonal transforming processor applies orthogonal transformation to the reduced image data to obtain reduced orthogonal transformation coefficient data. The first expanded image generating processor applies inverse orthogonal transformation to the reduced orthogonal transformation coefficient data to obtain expanded image data arranged in a third matrix comprised of a greater number of pixels than the second matrix. The contrast coefficient calculating processor obtains a contrast coefficient in such a manner that a contrast of the expanded image data becomes close to a contrast of the original image data by applying the contrast coefficient to the expanded image data. The contrast adjusting processor applies the contrast coefficient to the expanded image data to modify the expanded image data whereby modified expanded image data is obtained. The error evaluation function calculating processor calculates a value of an evaluation function, which corresponds to a difference between the original image data and the modified expanded image data. The displacement-amount selecting processor selects the displacement direction and amount of the reduced image area, for every objective pixel, in such a manner that the value of the evaluation function becomes a minimum.

According to a fourth aspect of the present invention, there is provided an image expansion apparatus for expanding reduced image data recorded in a recording medium by the image compression apparatus described above as the third aspect, which further comprises a data reading processor, a reduced image area selecting processor, a second orthogonal transforming processor, a second expanded image generating processor and a contrast adjusting processor.

The data reading processor reads the parameter, the contrast coefficient and the reduced image data from the recording medium. The reduced image area selecting processor selects a reduced image area based on the displacement direction and amount, corresponding to the objective pixel included in the reduced image data. The second orthogonal transforming processor applies the orthogonal transformation to the reduced image data of the reduced image area selected by the reduced image area selecting processor, for every objective pixel, to obtain reduced orthogonal transformation coefficient data. The second expanded image generating processor applies inverse orthogonal transformation to the reduced orthogonal transformation coefficient data to obtain expanded image data arranged in a third matrix comprised of a greater number of pixels than the second matrix. The contrast adjusting processor applies the contrast coefficient to the expanded image data to modify the expanded image data whereby modified expanded image data is obtained.

BRIEF DESCRIPTION OF THE DRAWINGS

The present invention will be better understood from the description of the preferred embodiments of the invention set forth below, together with the accompanying drawings, in which:

FIG. 7 is a view of the DCT coefficients of an 8×8 matrix and the pixel values comprising a third matrix of reproduced image data;

FIGS. 10A through 10D are views showing pixel values of a single block of the expanded image data, when the reduced image area is displaced in a predetermined direction by a predetermined amount relative to an objective pixel;

FIG. 11 is a view showing an example of evaluation function values relating to one block composed of 8×8 pixels when the reduced image area is displaced in the horizontal direction and the vertical direction by predetermined amounts relative to the second matrix;

FIGS. 18A through 18D are views showing pixel values of a single block of the modified expanded image data, and correspond to FIGS. 10A through 10D of the first embodiment; and FIG. 19 is a view showing an example of the contrast coefficients and the evaluation function values, and corresponds to FIG. 11 of the first embodiment.

DESCRIPTION OF THE PREFERRED EMBODIMENTS

Figure 1:
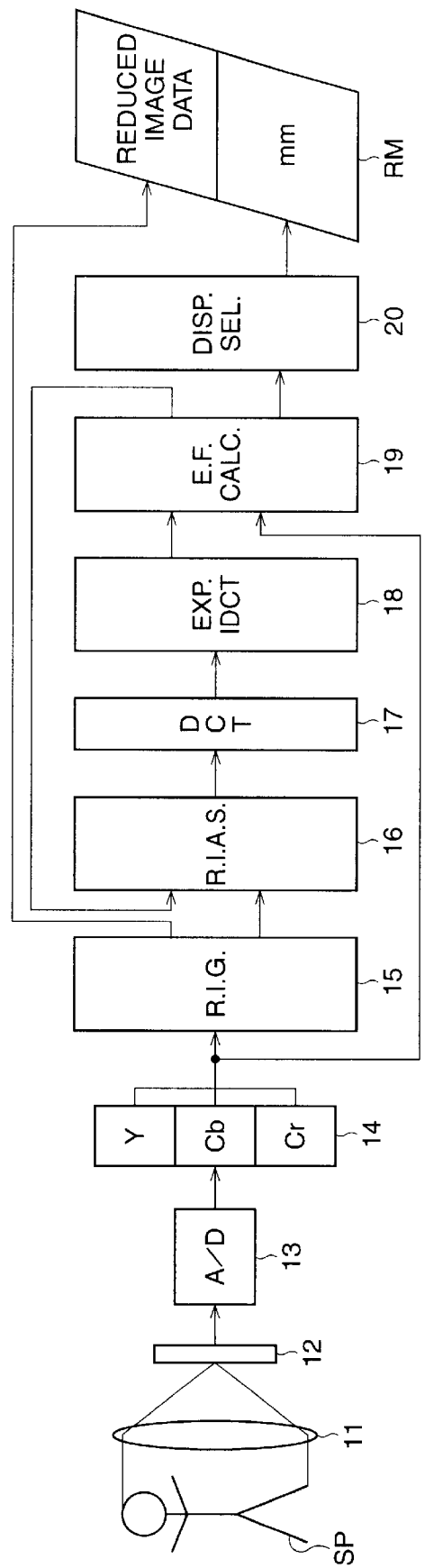
FIG. 1 is a block diagram of an image compression apparatus included in the image compression and expansion apparatus according to a first embodiment of the present invention.

The present invention will be described below with reference to embodiments shown in the drawings.

Figure 2:
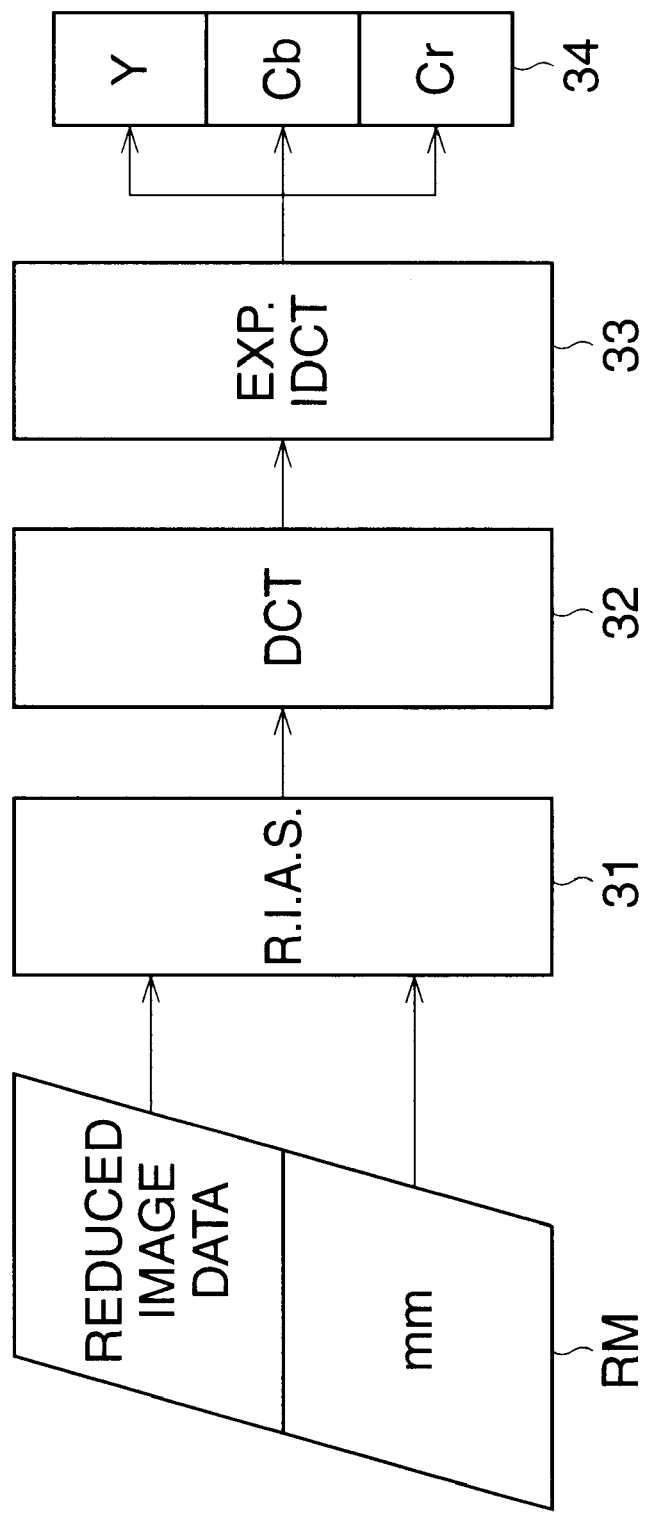
FIG. 2 is a block diagram of an image expansion apparatus included in the image compression and expansion apparatus according to the first embodiment of the present invention.

FIGS. 1 and 2 are block diagrams of an image compression and expansion apparatus according to a first embodiment of the present invention. FIG. 1 shows an image compression apparatus, while FIG. 2 shows an image expansion apparatus.

Light reflected from a subject being photographed SP is focused by a photographing optical system 11, whereby an optical image of the subject SP is formed on the light receiving surface of an imaging device 12. At the light receiving surface of the imaging device 12 are provided red (R), green (G), and blue (B) color filters. The imaging device 12 generates analog electrical signals corresponding to the R, G, and B images. These electrical signals are converted to digital electrical signals of the R, G, and B images at an AD converter 13. The R, G, and B image signals are converted to luminance data Y and color difference data Cb, Cr at a not shown image processing circuit and stored in a memory 14.

The luminance data Y and color difference data Cb, Cr are original image data comprised of approximately 1000 pixels in the horizontal direction and approximately 600 pixels in the vertical direction in the image arranged in a matrix. As described later, in a reduced image generator 15, a first matrix comprised of 64×64 pixels is extracted from the original image data and the original image data of the first matrix is reduced. In the reduction processing, the original image data is converted to reduced image data comprised by a second matrix. The second matrix is comprised of a smaller number of pixels than the first matrix. That is, the reduced image data is compressed from the luminance data Y and the color difference data Cb, Cr stored in the first memory 14. The compression rate is for example 1/64. The reduced image data is recorded in a recording medium RM such as an IC memory card.

In a reduced image area setting processor 16, a reduced image area is set for each pixel included in the reduced image data. As described in detail later, the reduced image area is defined by a sub-matrix obtained by displacing a second matrix in a predetermined direction by a predetermined amount, and contains an objective pixel, which is contained in the second matrix. The sub-matrix of the reduced image area has the same arrangement as the second matrix. For example, when the second matrix is comprised of 8×8 pixels, the sub-matrix of the reduced image area is comprised of 8×8 pixels. That is, a plurality of reduced image areas can be set for a single pixel, and for example, when the second matrix is comprised of 8×8 pixels, 64 reduced image areas can be set. In the reduced image area setting processor 16, a single reduced image area is set from the 64 reduced image areas.

In a first DCT processor 17, reduced image data included in the reduced image area is subjected to a two dimensional discrete cosine transformation (DCT), so that reduced DCT coefficient data is obtained. That is, the number of elements of the matrix, in which the reduced DCT coefficient data is arranged, is the same as that of the second matrix, in which the reduced image data is arranged.

In the first expanded IDCT processor 18, DCT coefficients, which are components of the matrix of the reduced DCT coefficient data, are subjected to the later described expanded two dimensional inverse discrete cosine transformation (expanded IDCT), so that expanded image data comprised of a third matrix is obtained. The number of pixels included in the third matrix is greater than that of the second matrix, and for example, the same as that of the first matrix.

If no data is lost because of processes in the reduced image generator 15 and the first DCT processor 17, the expanded image data is coincident with the original image data. Usually, however, since a part of the data is lost, each of the pixel values of the expanded image data is different from that of the original image data. In the evaluation function calculating processor 19, a value of an evaluation function, which corresponds to a difference between the original image data and the expanded image data corresponding to the original image data, is calculated. The calculation will be described later.

After the calculation of the value of the evaluation function at the evaluation function calculating processor 19, in the reduced image area setting processor 16, a reduced image area, which is different from that which has been processed, is set. In the first DCT processor 17, reduced DCT coefficient data is obtained regarding the newly set reduced image area. Then, in the first expanded IDCT processor 19, expanded image data is obtained, and in the evaluation function calculating processor 19, a value of an evaluation function is again calculated.

Thus, when the values of the evaluation function are calculated for all of the reduced image area, in a displacement-amount setting processor 20, displacement direction and amount of a reduced image area, by which a value of the evaluation function becomes a minimum, are selected for each of the objective pixels. A parameter "mm" indicating the optimum displacement direction and amount, which have been obtained for each of the objective pixels, are recorded in the recording medium RM, together with the reduced image data obtained in the reduced image generator 15.

The reduced image data corresponding to the luminance data Y and the color difference data Cb, Cr, and the parameter "mm" of the optimum displacement direction and amount are read from the recording medium RM. In a reduced image area selecting processor 31, for every pixel included in the reduced image data, the displacement direction and the displacement amount of the reduced image area relative to the pixel is selected based on the first parameter "mm". In a second DCT processor 32, for every pixel, the reduced image data of the reduced image area is subjected to the two dimensional DCT, so that DCT coefficients are obtained. The DCT coefficients are subjected to an expanded IDCT in a second IDCT processor 33, so that expanded image data comprised of the third matrix is obtained. The expanded image data is stored in a second memory 34 in a format of luminance data Y and color difference data Cb, Cr.

Figure 3:
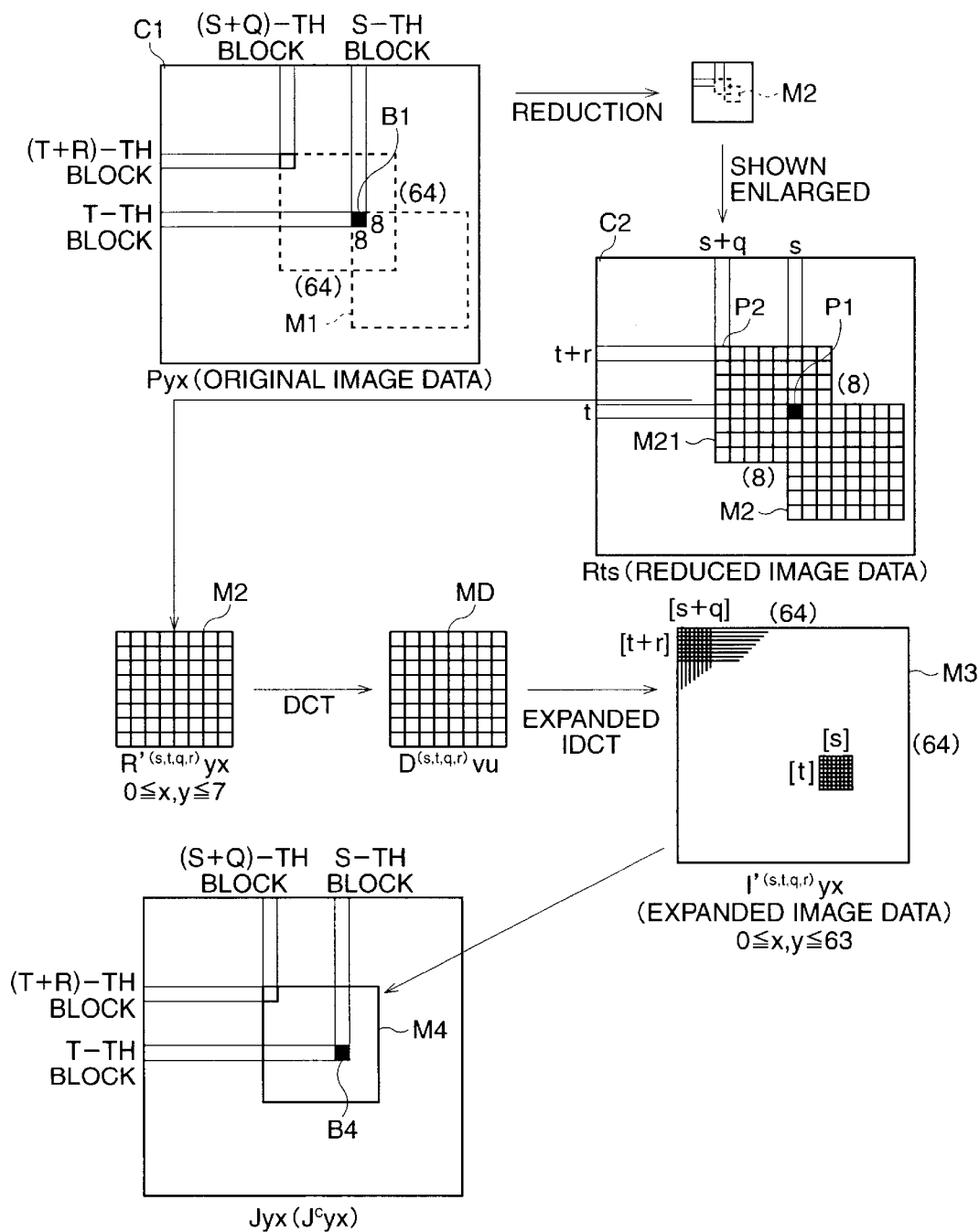
FIG. 3 is a view of matrixes of image data processed in the image compression and expansion apparatus shown in FIG. 1 and FIG. 2.
Figure 4:
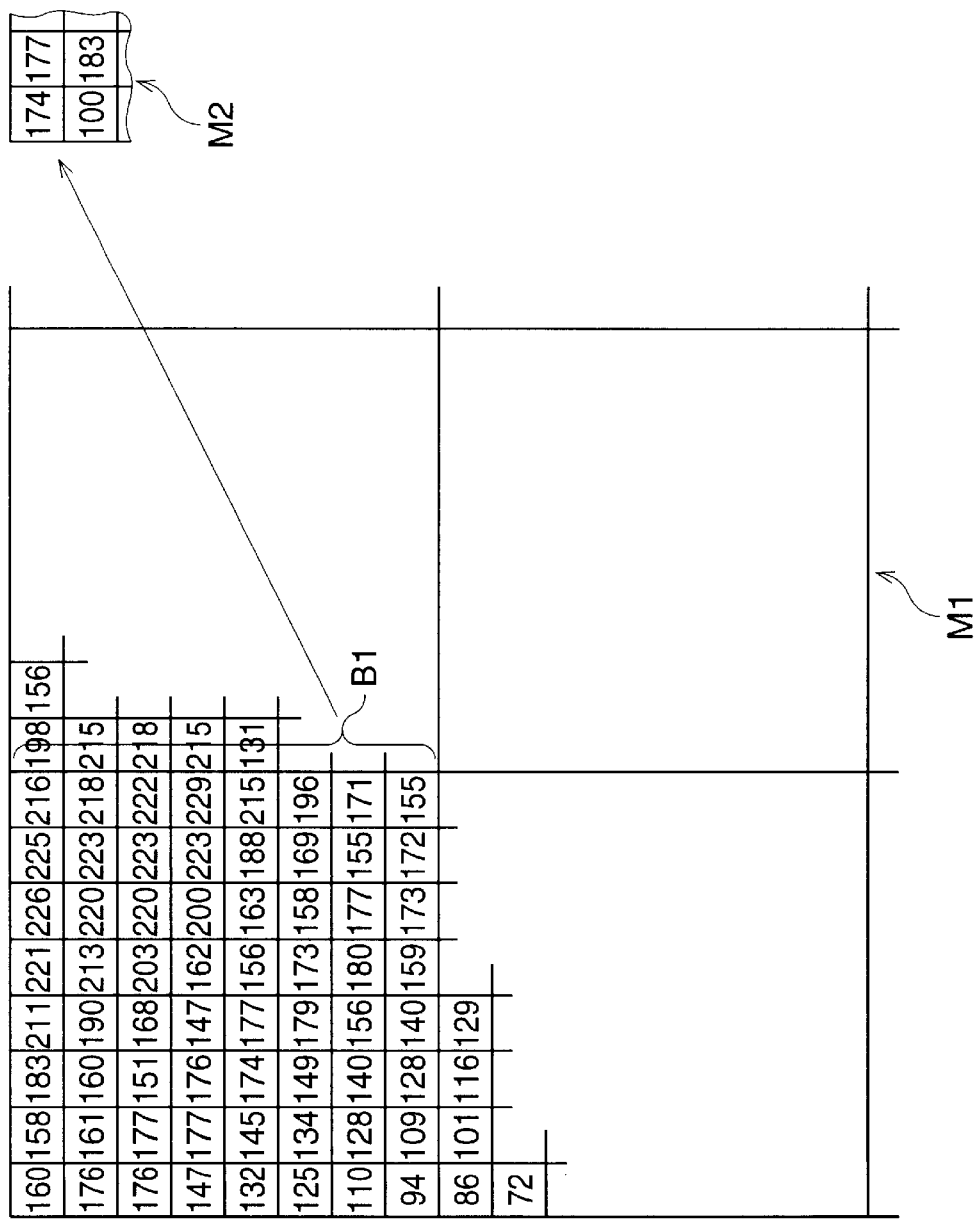
FIG. 4 is a view of the reduction processing in a reduced image generator.

FIG. 3 is a view of matrixes of image data processed in the image compression and expansion apparatus shown in FIG. 1 and FIG. 2. FIG. 4 is a view of reduction processing in the reduced image generator 15. An explanation will be made next of the operation of the reduced image generator 15 referring to FIG. 3 and FIG. 4.

The original image data is comprised of approximately 1000×600 pixel values Pyx and is divided into unit blocks comprised of 8×8 pixels. In FIG. 3, the block B1 has the upper left corner block of the original image data as its origin and is positioned at the s-th block in the horizontal direction and the t-th block in the vertical direction. The first matrix M1 is comprised by 64 unit blocks comprising 8 blocks in the horizontal direction and 8 blocks in the vertical direction. That is, the first matrix M1 is comprised of 64×64 pixel values Pyx.

In the reduced image generator 15, a second matrix M2 is generated based on the original image data contained in the first matrix M1. The pixel value Rts in the second matrix M2 is shown by the following formula (1). That is, the pixel value Rts of the second matrix M2 is obtained by finding the average value of 8×8 pixel values Pyx comprising the block B1 in the first matrix M1:

$$R_{ts} = \left( \sum_{x=s\times 8}^{s\times 8+7} \sum_{y=t\times 8}^{t\times 8+7} P_{yx} \right) / 64 \qquad (1)$$

The origin in the original pixel data is the pixel of the upper left corner C1 of the image. x shows the coordinate of the pixel in the horizontal direction, while y is the coordinate of the pixel in the vertical direction.

In the example shown in FIG. 4, the block B1 included in the first matrix M1 is comprised of 64 pixel values Pyx of 160, 158, 183, 211, 221, 226 . . . . The average value 174 of the 64 pixel values Pyx is found as the corresponding pixel value Rts of the second matrix M2.

In this way, the second matrix M2 is comprised of 8×8 pixel values. The reduced image data comprised of the second matrix M2 shows the original image by fewer pixels than the original image data. In other words, the block B1 positioned at the s-th block in the horizontal direction of the original image data and the t-th block in the vertical direction corresponds to the pixel P2 positioned at the s-th pixel in the horizontal direction of the reduced image data and the t-th pixel in the vertical direction.

Figure 5:
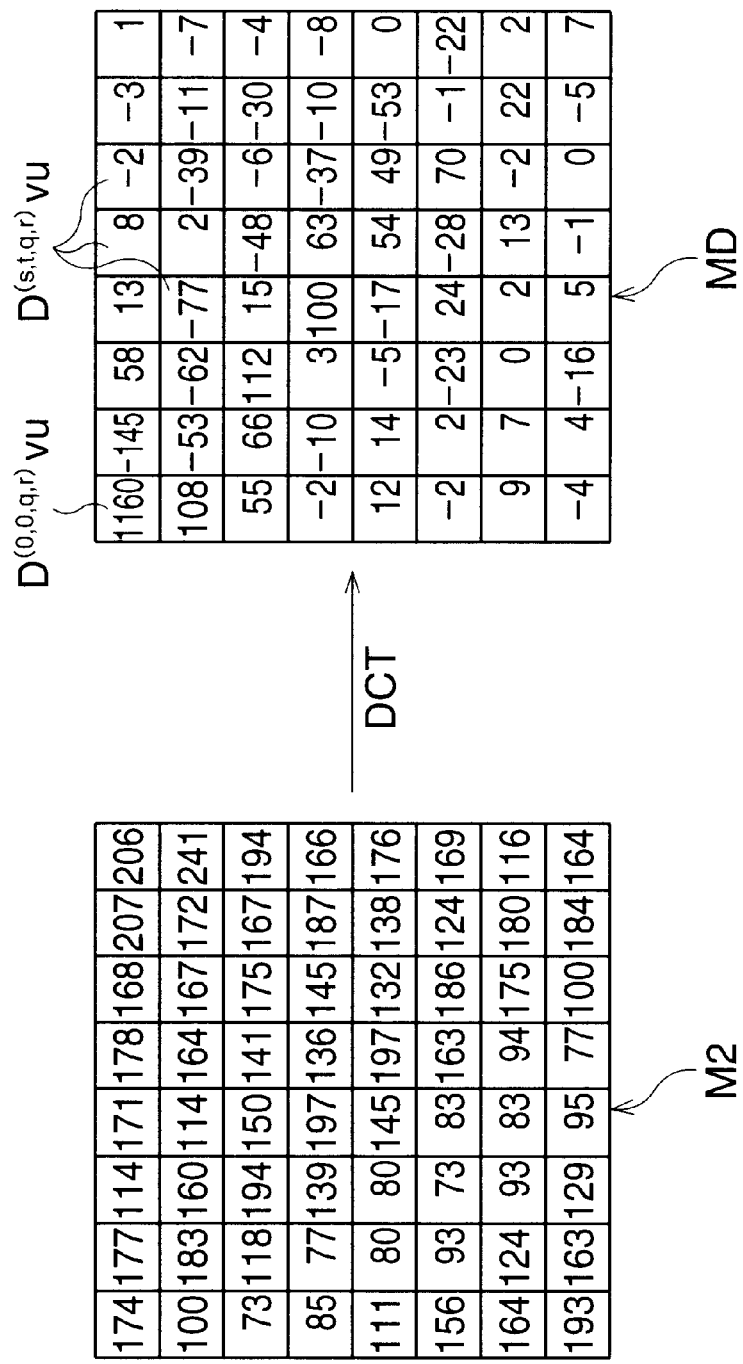
FIG. 5 is a view of 8×8 pixel values of a second matrix and DCT coefficients corresponding to the image data comprised of the pixel values.

FIG. 5 shows the 8×8 pixel values of the second matrix M2 and the DCT coefficients of these pixel values. With reference to FIG. 3 and FIG. 5, the two dimensional DCT performed in the first and second DCT processors 17 and 32 is explained.

In the reduced image data, the pixel value Rts, which is a component of the second matrix M2, is indicated by a (s,t) coordinate system having the upper left corner C2 in the reduced image data as the origin.

When the DCT is performed regarding a pixel value Rts of the second matrix M2, and further the expanded IDCT is performed to obtain expanded image data, the expanded image data corresponding to a pixel P1, for example, can be calculated using a sub-matrix M21 composed of 8×8 pixels containing the pixel P1. The sub-matrix M21 is obtained by displacing the second matrix M2 in a horizontal direction and a vertical direction, respectively, by seven pixels at most. There are 64 sub-matrixes including the case in which the sub-matrix is coincident with the second matrix M2. An area, which is comprised of the matrix M21 and includes an objective pixel P2 contained in the reduced image data, is referred to as "reduced image area" in this specification.

Prior to the DCT performed in the first and second DCT processors 17 and 32, in the reduced image area setting processors 16 and the reduced image area selecting processor 31, a predetermined reduced image area is set or selected, respectively. In the DCT processors 17 and 32, for the DCT, the pixel value Rts is converted to a coordinate system having the left corner P2 in the second matrix M21 of the reduced image area as an origin, in accordance with formula (2):

$$R_{yx}'^{(s,t,q,r)} = R_{t+r+y, s+q+x} \quad (2)$$

where, $0 \leq x, y \leq 7, -7 \leq q, r \leq 0$

Note that, in formula (2), reference "q" indicates a displacement of the sub-matrix M21 of the reduced image area, relative to the second matrix M2, in a horizontal direction, and the amount of displacement in a left direction has a negative value. For example, when the sub-matrix M21 is displaced leftward by 5 pixels relative to the second matrix M2, as shown in FIG. 3, q=−5. Reference "r" indicates a displacement of the sub-matrix M21 of the reduced image area, relative to the second matrix M2, in a vertical direction, and the amount of displacement in an up direction has a negative value.

The DCT is performed in the first and second DCT processors 17 and 32 in accordance with the following formula (3):

$$D_{vu}^{(s,t,q,r)} = \frac{1}{4} CuCv \sum_{x=0}^{7}\sum_{y=0}^{7} R_{yx}'^{(s,t,q,r)} \cdot \cos\frac{(2x+1)u\pi}{16}\cos\frac{(2y+1)v\pi}{16} \quad (3)$$

where, $Cu, Cv = 1/\sqrt{2} : u, v = 0$ $Cu, Cv = 1 : u, v \neq 0$

In a matrix MD comprised of the DCT coefficients $D^{(s,t,q,r)}vu$ obtained by the DCT, the DCT coefficient $D^{(s,t,q,r)}00$ at the origin (0,0) is the direct current (DC) component while the remaining 63 DCT coefficients $D^{(s,t,q,r)}vu$ are alternating current (AC) components. The DC component corresponds to the average value of the 8×8 pixel values comprising the second matrix, while the AC components correspond to the predetermined spatial frequency components.

Figure 6:
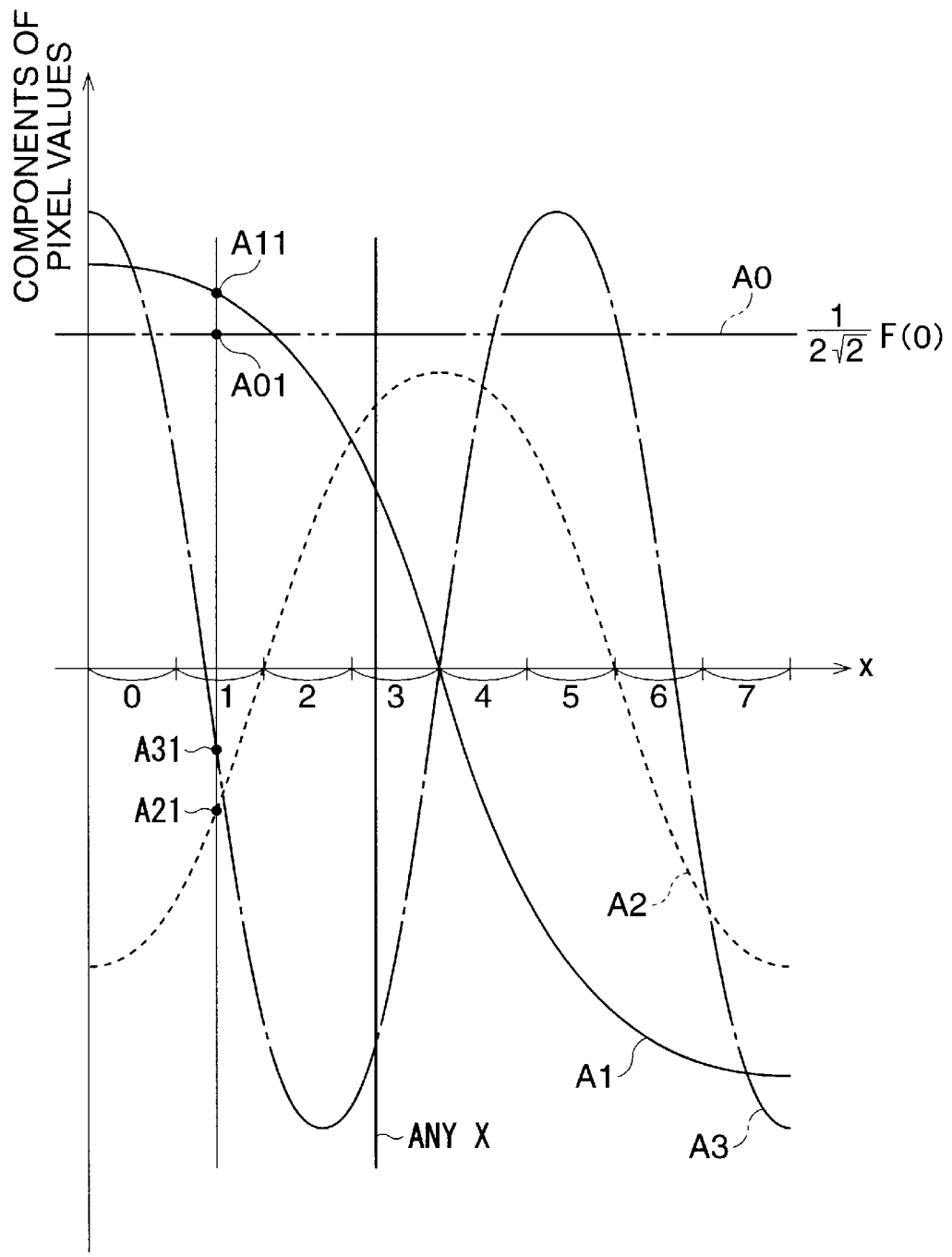
FIG. 6 is a view of the component relating to the DC component F(0) in the pixel value and the components relating to the AC components F(1), F(2), and F(3)

With reference to FIG. 3 and FIG. 6, the expanded IDCT performed in the first and second expanded IDCT processor 18 and 33 is described below.

Here, for simplification of the description, the case where the matrix of the image data is arranged one-dimensionally, that is, one dimensional expanded IDCT, will be explained.

The one dimensional discrete cosine transformation (one dimensional DCT) on the image data comprised of 8 pixels Px (=$P_0, P_1, P_2, \ldots P_7$) arranged one-dimensionally is expressed by the following formula (4):

$$F(u) = \frac{1}{2} Cu \sum_{x=0}^{7} P_x \cos\frac{(2x+1)u\pi}{16} \quad (4)$$

where, $Cu = \frac{1}{\sqrt{2}} : u = 0$ $Cu = 1 : u \neq 0$

As can be understood from formula (4), a spatial frequency component F(u) is obtained based on the pixel values Px at the 8 regions x by a one dimensional discrete cosine transformation. The number of types of spatial frequencies (i.e., the number of "u's") is equal to the number of regions x and is 8 in the case where the number of regions x is 8. That is, in this case, the DC component F(O) and the seven AC components F(1), F(2), . . . F(7) are obtained.

The one dimensional inverse discrete cosine transformation (one dimensional IDCT) is expressed by the following formula (5):

$$P_x' = \frac{1}{2}\sum_{u=0}^{7} CuF(u)\cos\frac{(2x+1)u\pi}{16} \quad (5)$$

As can be understood from formula (6), a pixel value P'x is obtained based on the 8 spatial frequency components F(u) by the one dimensional inverse discrete cosine transformation.

FIG. 6 shows the component relating to the DC component F(0) and the components relating to the AC components F(1), F(2), and F(3) in a pixel value P'x. The component A0 of the pixel value P'x relating to the DC component F(0) is expressed by:

$$\frac{1}{2\sqrt{2}} F(0)$$

The component A1 of the pixel value P'x relating to the AC component F(1) is expressed by:

$$\frac{1}{2}F(1)\cos\frac{(2x+1)\pi}{16}$$

The component A2 of the pixel value P'x relating to the AC component F(2) is expressed by:

$$\frac{1}{2}F(2)\cos\frac{2(2x+1)\pi}{16}$$

The component A3 of the pixel value P'x relating to the AC component F(3) is expressed by:

$$\frac{1}{2}F(3)\cos\frac{3(2x+1)\pi}{16}$$

A pixel value P'x is the sum of the components of the pixel value P'x relating to all of the spatial frequency components F(0), F(1), F(2), . . . F(7). For example, the pixel value at x=1 is expressed by the following formula (6):

$$P'_1 = \frac{1}{2}\sum_{u=0}^{7} CuF(u)\cos\frac{3u\pi}{16} \quad (6)$$

$$\text{where, } Cu = \frac{1}{\sqrt{2}} : u = 0$$

$$Cu = 1 : u \neq 0$$

In FIG. 6, the components A01, A11, A21, and A31 of the pixel values relating to the spatial frequency components F(0), F(1), F(2), and F(3) in formula (6) are indicated.

Using the same technique as when obtaining the pixel value $P_1$ at x=1, that is, by interpolation at the curves of the components A0, A1, A2, A3 . . . (see FIG. 6) of the pixel value P'x relating to the spatial frequency components F(0), F(1), . . . F(7), it is possible to obtain the pixel values P'x at any region x. For example, the pixel values, when dividing the range 0 to 7 of the region x of the pixels equally by 64, that is, relating to x=0, 0.125, 0.25, 0.375, 0.5, 0.625, . . . 7.75, and 7.875, are obtained by formula (7):

$$P'x = \frac{1}{2}\sum_{u=0}^{7} CuF(u)\cos\frac{(2x+1)u\pi}{128} \quad (7)$$

Note that in formula (7), the denominator of the cosine was made 128 so as to handle the regions x as integer numbers.

Further finely dividing the range of the regions x and performing inverse discrete cosine transformation in this way is called "expanded IDCT" in this specification. In other words, the expanded IDCT is to apply the IDCT in such a manner that a sampling number of pixel data obtained by the normal IDCT becomes B number greater than A number which is the sampling number of the normal DCT coefficients. The expanded IDCT can also be applied to two dimensional array image data in the same way as the case of such one dimensional array image data. Formula (8) shows a formula for performing the expanded IDCT in the case of a two dimensional array and obtaining the image values $I'^{(s,t,q,r)}yx$.

$$I'^{(s,t,q,r)}_{yx} = \frac{1}{4}\sum_{u=0}^{7}\sum_{v=0}^{7} CuCvD^{(s,t,q,r)}_{vu} \cdot \cos\frac{(2x+1)u\pi}{128}\cos\frac{(2y+1)v\pi}{128} \quad (8)$$

where, $0 \leq x \leq 63, 0 \leq y \leq 63$

According to the expanded IDCT shown in formula (8), the 8×8 DCT coefficients $D^{(s,t,q,r)}vu$ comprising the matrix MD, as shown in FIG. 7, are transformed into a third matrix M3 comprised of 64×64 pixel values $I'^{(s,t,q,r)}yx$. The third matrix M3 is the expanded image data as described above.

A coordinate (x,y) of the pixel value $I'^{(s,t,q,r)}yx$ in the third matrix M3 has the upper left corner as the origin, similarly to the second matrix M2. Therefore, for changing the coordinate system of the pixel value $I'^{(s,t,q,r)}yx$ of the third matrix M3 to the same coordinate system as the original image data, a coordinate transformation is performed in accordance with formula (9), so that a fourth matrix M4 is obtained.

$$J_{(t+r)\times 8+y, (s+q)\times 8+x} = I'^{(s,t,q,r)}_{yx} \quad (9)$$

As can be understood from formula (9), the coordinate transformation for obtaining the fourth matrix M4 is performed based on a position (s+q,t+r) of an upper left pixel of the matrix M21 of the reduced image area in the reduced image data, and a position (x,y) of the pixel value $I'^{(s,t,q,r)}yx$ in the third matrix M3. Note that, in the following explanation, a pixel value of the fourth matrix M4 shown in the left side of formula (9) is indicated as Jyx.

Figure 8:
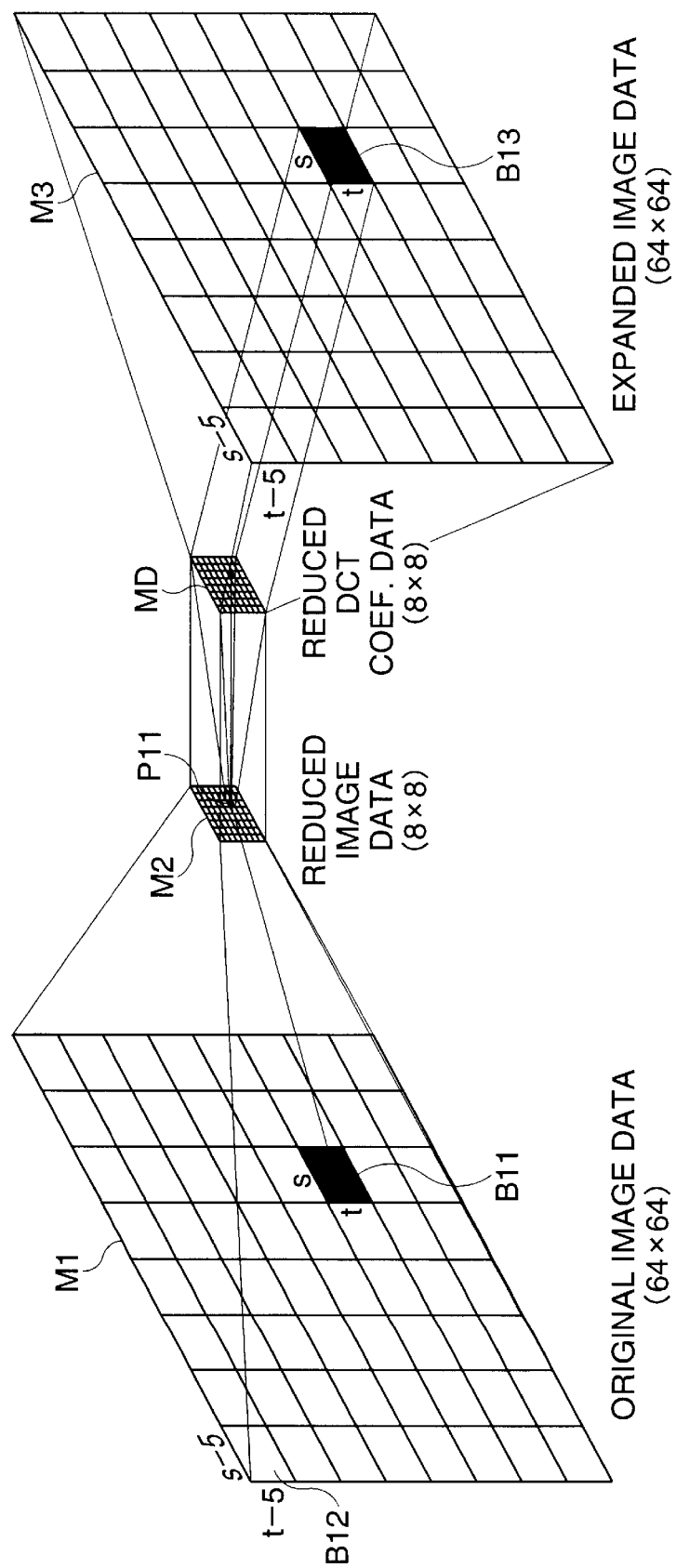
FIG. 8 is a view three-dimensionally showing a relationship among original data, reduced image data, reduced DCT coefficient data and expanded image data.

FIG. 8 is a view three-dimensionally showing a relationship among the original data, the reduced image data, the reduced DCT coefficient data and the expanded image data. Based on the drawing, the relationship among the data is described below. Note that the matrixes M1, M2, M3 and MD shown in FIG. 8 are offset relative to the matrixes M1, M2, M3 and MD shown in FIG. 3.

The first matrix M1 of the original image data is composed of 64×64 pixels. In the first matrix M1, a block B11 is positioned at the s-th block in the horizontal direction and the t-th block in the vertical direction from the origin of the original image data, and a block B12 of the upper left corner is positioned at (s-5)-th block in the horizontal direction and the (t-5)-th block in the vertical direction from the origin of the original image data. That is, the block B11 is positioned at the 5th block in the horizontal direction and the 5th block in the vertical direction, in the coordinate system having the block B12 as the origin.

A pixel P11 in the second matrix M2 of the reduced image data is obtained by averaging 8×8 pixels arranged in the block B11 of the first matrix M1, and the second matrix M2 is composed of 8×8 pixels. The reduced DCT coefficient data is obtained by applying the two dimensional DCT to the reduced image data, and the matrix MD is composed of 8×8 DCT coefficients. Due to the two dimensional DCT, information relating to the single pixel P11 contained in the second matrix M2 is diffused to all elements forming the reduced DCT coefficient data (i.e., DCT coefficient). That is, all of the DCT coefficients relate to each of the pixels contained in the second matrix M2.

The reduced DCT coefficient data is converted to expanded image data by the expanded IDCT, by which, based on 8×8 DCT coefficient which is the reduced DCT coefficient data, the expanded image data comprised of 64×64 pixels is obtained. That is, regarding the expanded image data, an 8×8 pixel block B13 corresponding to the block B11 of the original image data is obtained based on all of the DCT coefficients contained in the matrix MD.

Figure 9:
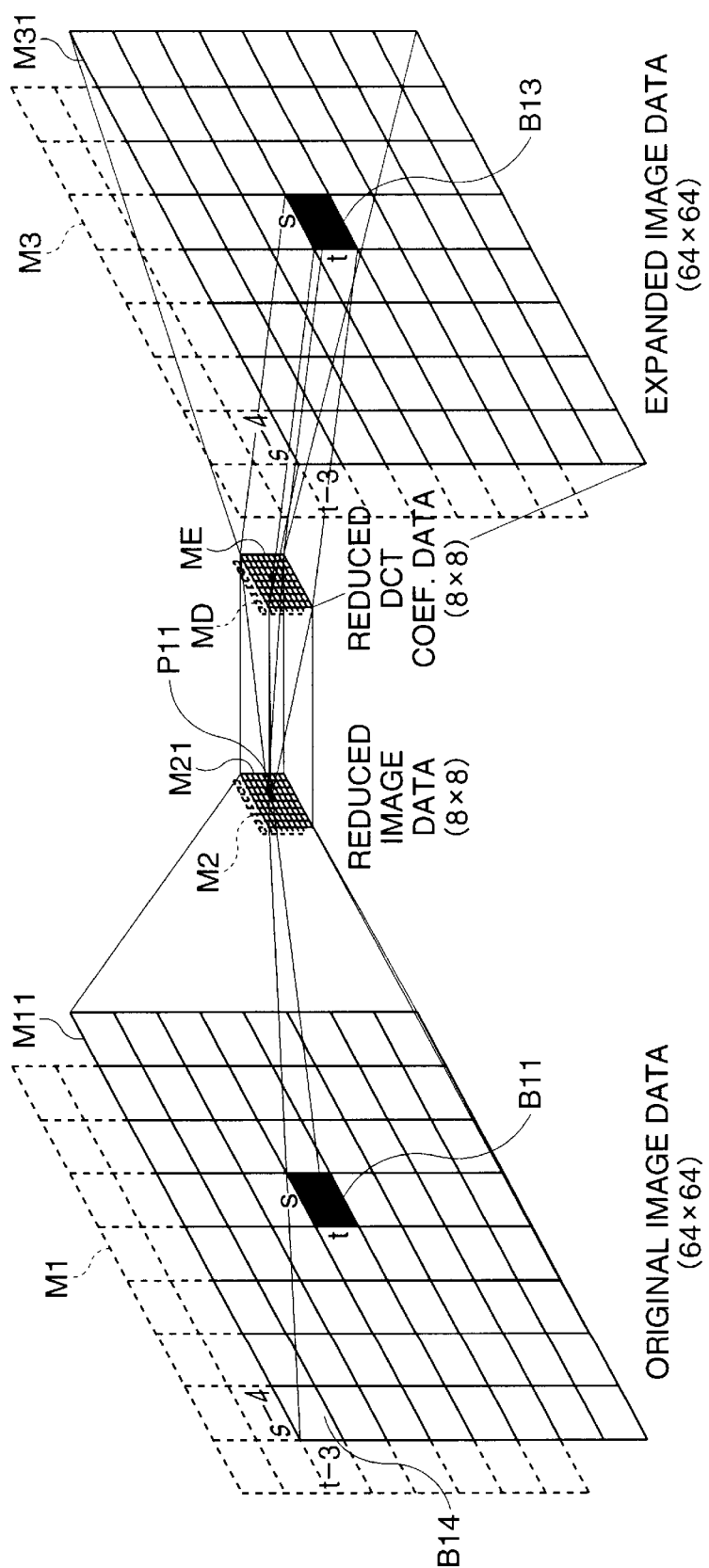
FIG. 9 is a view three-dimensionally showing a relationship among the original data, the reduced image data, the reduced DCT coefficient data and the expanded image data, when the reduced image data, the reduced DCT coefficient data and the expanded image data are obtained, regarding the matrix which is obtained by displacing the first matrix upward by 2 blocks and leftward by 1 block in the original image data.

FIG. 9 is a view three-dimensionally showing a relationship among the original data, the reduced image data, the reduced DCT coefficient data and the expanded image data, when the reduced image data, the reduced DCT coefficient data and the expanded image data are obtained, regarding the matrix M11 which is obtained by displacing the first matrix M1 rightward by 1 block and downward by 2 blocks in the original image data. An upper left block B14 of the matrix M11 is positioned at the (s-4)-th block in the horizontal direction and the (t-3)-th block in the vertical direction from the origin of the original image data, and the block B11 is positioned at 4th block in the horizontal direction and the 3rd block in the vertical direction in a coordinate system having an upper left block B14 of the matrix M11 as the origin.

When applying the reduction processing to the matrix M11 of the original image data to obtain the reduced image data, the matrix M21 corresponding to the matrix M11 is offset rightward by 1 pixel and downwardly by 2 pixels relative to the second matrix M2, in the reduced image data. Therefore, a matrix ME of the reduced DCT coefficient data obtained from the reduced image data of the matrix M21 is offset rightward by 1 pixel and downward by 2 pixels relative to the matrix MD. In the expanded image data, a matrix M31 corresponding to the matrix M21 is offset rightward by 1 block and downward by 2 blocks relative to the third matrix M3.

8×8 pixel values of the block B13 in the expanded image data are changed in accordance with pixels arranged in the matrix ME of the reduced DCT coefficient data. That is, the pixel values of the block B13 are changed in accordance with the matrix M21 of the reduced image data or the matrix M11 of the original image data.

The matrix M11 is obtained by displacing the first matrix M1 in the horizontal direction or the vertical direction in such a manner that the block B11 is contained in the matrix M11, and the displacement range is 7 block's worth at most in each of the horizontal direction and the vertical direction. Similarly, the matrix M21 is obtained by displacing the second matrix M2 in the horizontal direction or the vertical direction by 7 pixels at most, respectively, in such a manner that the pixel P11 is contained in the matrix M21. Therefore, there are 64 variations of matrixes M11 and M21, respectively, including a case in which the displacement amount is 0 in each of the horizontal direction and the vertical direction. Thus, 8×8 pixel values of the block B13 of the expanded image data have 64 variations.

FIGS. 10A through 10D show pixel values $I'^{(s,t,q,r)}{}_{yx}$ of a single block of the expanded image data, when the reduced image area is displaced in a predetermined direction by a predetermined amount. Note that an example shown in the drawing shows a pixel value of a block corresponding to the upper left pixel P1 (see FIG. 3) of the second matrix M2, and correspond to 8×8 pixels positioned at the upper left of the third matrix M3 shown in FIG. 7.

A shift (q,r) shows displacement amounts in the horizontal and vertical directions of the reduced image area. The shift (q,r)=(0,0) corresponds to a case in which the pixel P1 is positioned at an upper left corner of the matrix M21 of the reduced image area, and in this case, the matrix M21 is coincident with the second matrix M2. The shift (q,r)=(-4,-3) corresponds to a case in which the matrix M21 is displaced rightward by 4 pixels and downward by 3 pixels from a condition of the shift (q,r)=(0,0) relative to the second matrix M2.

As can be understood from FIGS. 10A through 10D, pixel values of each of the blocks of the expanded image data are changed in accordance with a relative position of the reduced image area to the second matrix M2. That is, an optimum reduced image area can be selected in such a manner that 8×8 pixels forming each of the blocks of the expanded image data become as close to 8×8 pixels of the corresponding original image data as possible, and the relative position of the optimum reduced image area to the objective pixel is varied or changed depending on the blocks.

For selecting the reduced image area, an evaluation function value $E^{(s,t)}$ is calculated in accordance with formula (10).

$$E^{(s,t)} = \sum_{x=s\times 8}^{s\times 8+7} \sum_{y=t\times 8}^{t\times 8+7} (J_{yx} - P_{yx})^2 \qquad (10)$$

As can be understood from formula (10), the value of the evaluation function is a sum of a square of differences between 8×8 pixels of a block included in the first matrix M1 and pixels which are included in the corresponding block of the fourth matrix M4 and correspond to the pixels of the block of the first matrix M1.

FIG. 11 shows an example of the evaluation function values $E^{(s,t)}$ relating to one block composed of 8×8 pixels when the reduced image area is displaced in the horizontal direction and the vertical direction by predetermined amounts relative to the second matrix M2. The shift (q,r)=(0,0) shows a case in which the pixel P2 (see FIG. 3) of the upper left corner in the matrix M21 of the reduced image area is coincident with the pixel P2 (see FIG. 3) of the upper left corner of the second matrix M2. When the reduced image area is displaced leftward by 1 pixel, the value of "q" is decreased by 1, and when the reduced image area is displaced upward by 1 pixel, the value of "r" is decreased by 1. That is, the shift (q,r)=(-7,-7) corresponds to a case in which the pixel of the lower right corner in the matrix M21 of the reduced image area is coincident with the pixel P2 of the upper left corner of the second matrix M2. In the example shown in FIG. 11, the evaluation function value $E^{(s,t)}$ is the minimum (=16654) when the shift (q,r)=(-7,-3).

Figure 12:
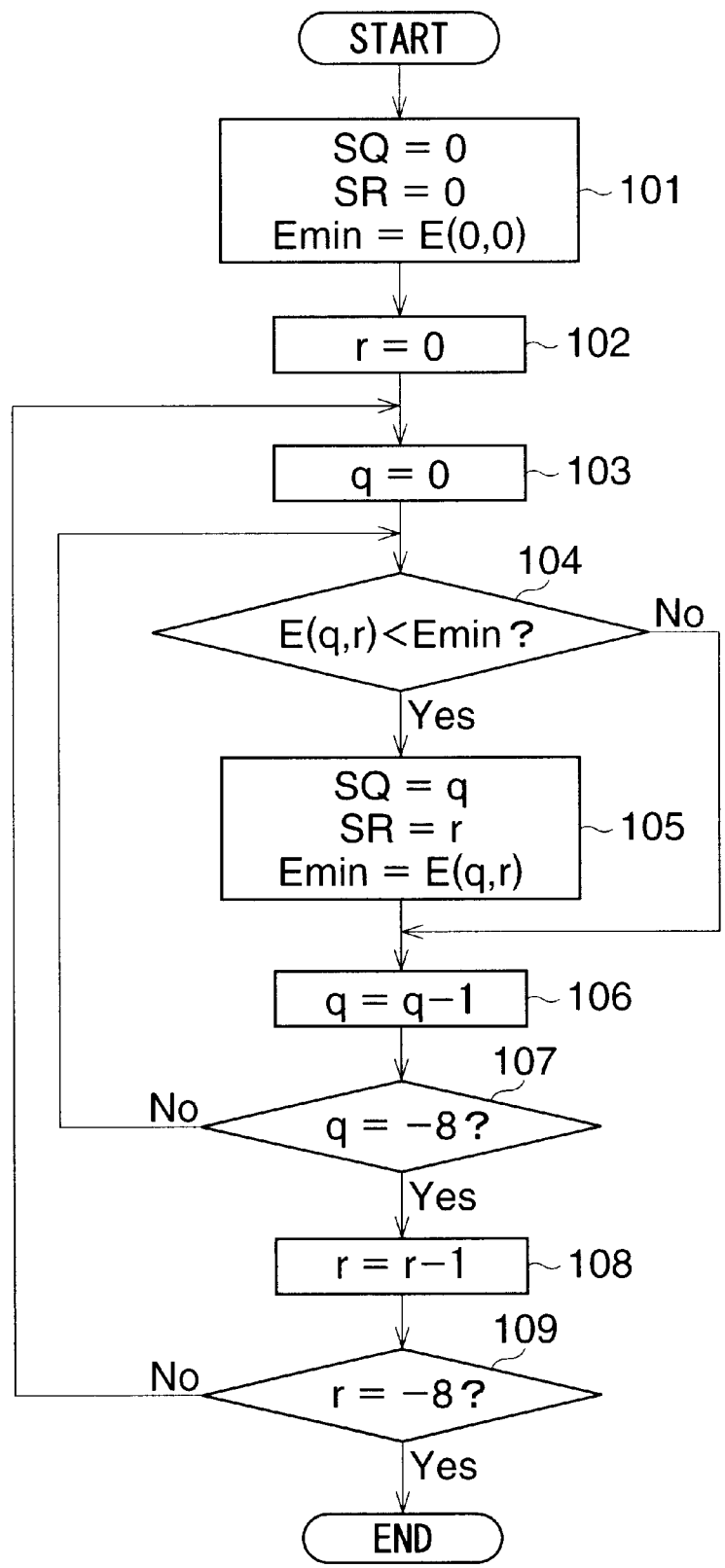
FIG. 12 is a flowchart of a minimum evaluation function value selection program.

FIG. 12 shows a flowchart of a minimum evaluation function value selection program for obtaining the optimum evaluation function value $E^{(s,t)}$. The program is executed for each block of the first matrix M1 corresponding to each pixel of the second matrix M2, in the displacement-amount selecting processor 20 (see FIG. 1). That is, the optimum evaluation function value is obtained for every block.

In Step 101, optimum values SQ and SR of the displacement amounts in the horizontal and vertical directions relative to the second matrix M2 of the reduced image area are set to initial values 0, respectively. This corresponds to the shift (q,r)=(0,0). Further, in Step 101, the evaluation function value E(0,0) of the shift (q,r)=(0,0) is set to an initial value of the optimum evaluation function value Emin. In Step 102, the displacement amount "r" in the vertical direction is set to 0, and in Step 103, the displacement amount "q" in the horizontal direction is set to 0.

In Step 104, it is determined whether an evaluation function value E(q,r), which has the shift (q,r), is less than the optimum evaluation function value Emin which is set at present. When the evaluation function value E(q,r) is less than the present optimum evaluation function value Emin, Step 105 is executed, in which the evaluation function value E(q,r) is substituted for the optimum evaluation function value Emin. Further, in Step 105, the displacement amounts "q" and "r" are set as the optimum values SQ and SR. When it is determined in Step 104 that the evaluation function value E(q,r) is greater than or equal to the present optimum evaluation function value Emin, Step 105 is not executed.

In Step 106, the displacement amount "q" in the horizontal direction is decreased by 1. That is, in the next executions of Steps 104 and 105, the process, regarding the reduced image area which is shifted leftward by one pixel, is executed.

In Step 107, it is determined whether the displacement amount "q" is equal to −8. When the displacement amount "q" is not equal to −8, the routine goes back to Step 104, so that the process described above is executed. Conversely, when the displacement amount is equal to −8, the executions of Steps 104 and 105, regarding the reduced image area which is shifted leftward by 7 pixels relative to the second matrix M2, have been completed. In this case, for executing Steps 104 and 105 regarding the reduced image area in which the vertical position is different from that of reduced image areas processed so far, Steps 108 and 109 are executed. In Step 108, the displacement amount "r" in the vertical direction is decreased by 1. In Step 109, it is determined whether the displacement amount "r" is equal to −8. When the displacement amount "r" is not equal to −8, the routine goes back to Step 103. That is, the displacement amount "q" is reset to 0, and Steps 104 through 107 are again executed.

Conversely, when it is determined in Step 109 that the displacement amount "r" is equal to −8, Step 104 has been executed regarding the reduced image areas of 64 variations so that the optimum evaluation function value is detected, and this program ends.

As explained above, according to the present embodiment, in the evaluation function calculating processor 19, the evaluation function values are obtained by checking the reduced image areas of 64 variations, regarding all pixels contained in the second matrix M2. Then, in the displacement-amount selecting processor 20, the displacement direction and the displacement amount of the reduced image area by which the expanded image data becomes closest to the original image data, is obtained for every block of the first matrix M1 corresponding to each pixel of the second matrix M2. The parameter "mm" indicating the displacement direction and the displacement amount is recorded, together with the reduced image data, in the recording medium RM. Accordingly, in the image expansion apparatus (see FIG. 2), the expanded IDCT can be performed based on the displacement direction and the displacement amount, so that a quality of the reproduced image can be improved.

Figure 13:
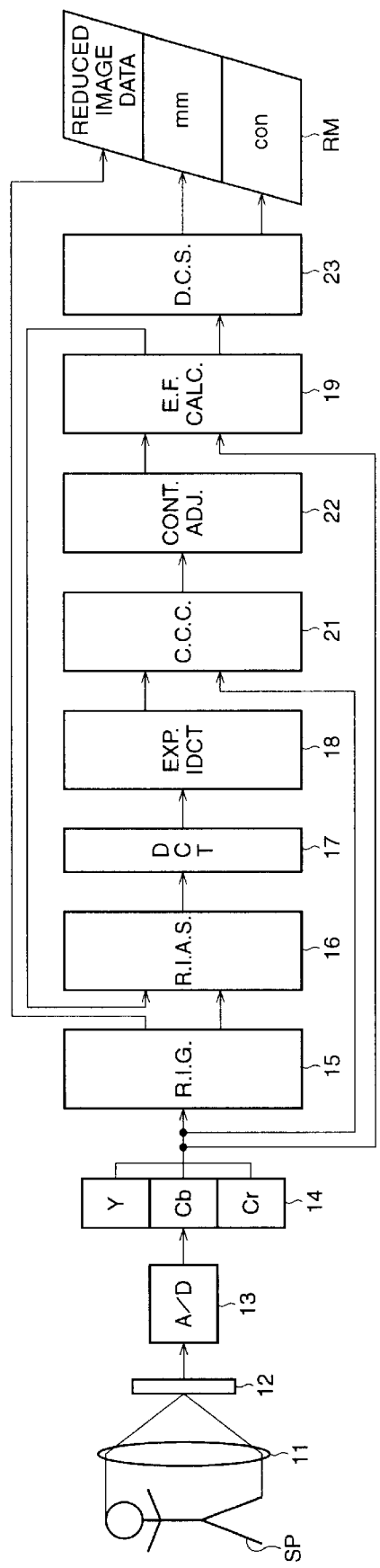
FIG. 13 is a block diagram of an image compression apparatus included in the image compression and expansion apparatus according to a second embodiment of the present invention.
Figure 14:
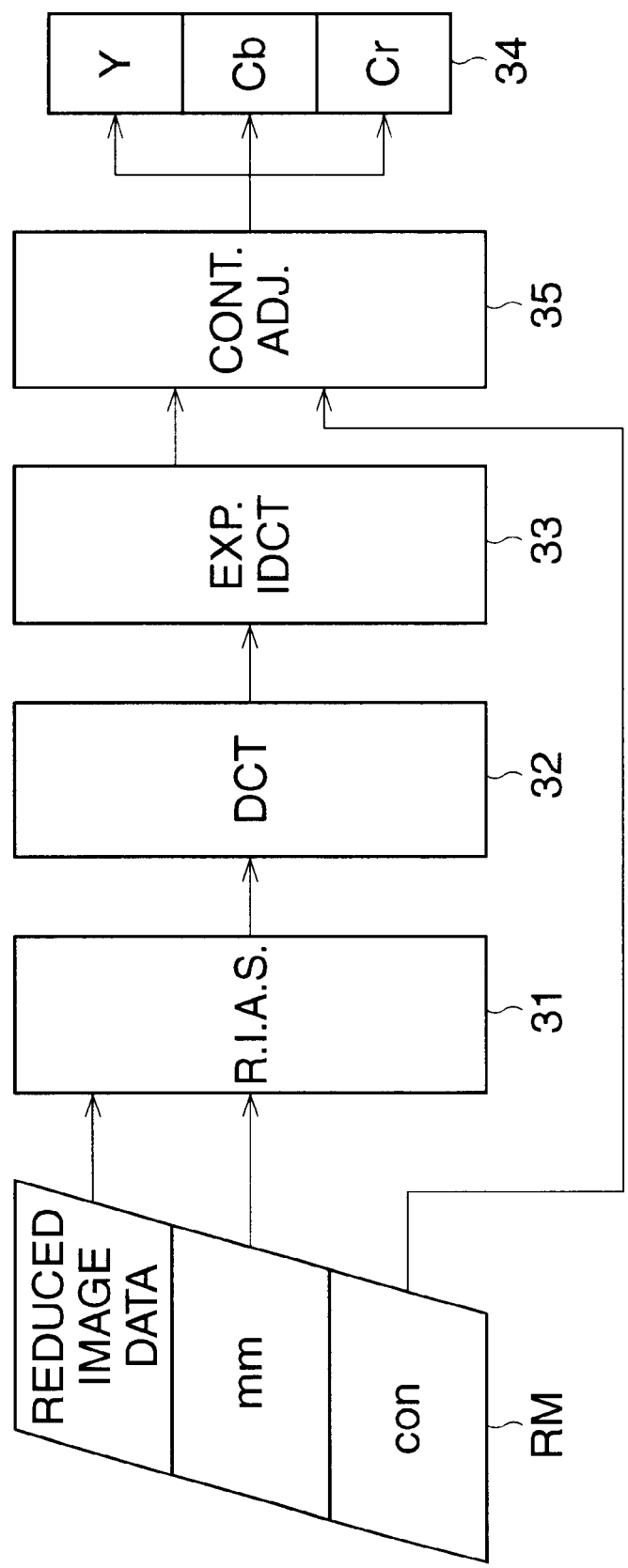
FIG. 14 is a block diagram of an image expansion apparatus included in the image compression and expansion apparatus according to the second embodiment of the present invention.

FIGS. 13 and 14 are block diagrams of an image compression and expansion apparatus according to a second embodiment of the present invention. FIG. 13 shows an image compression apparatus, while FIG. 14 shows an image expansion apparatus. Components corresponding to those of the first embodiment shown in FIGS. 1 and 2, are indicated in FIGS. 13 and 14 by the same references as used in FIGS. 1 and 2.

Constructions different from those of the first embodiment are described below.

In the image compression apparatus of the second embodiment, a contrast coefficient calculating processor 21 and a first contrast adjusting processor 22 are provided between the first expanded IDCT processor 18 and the evaluation function calculating processor 19. A displacement-amount/contrast-coefficient selecting processor 23 is provided behind the evaluation function calculating processor 19. On the other hand, in the image expansion apparatus, a second contrast adjusting processor 35 is provided behind the expanded IDCT processor 33. The other constructions are the same as those of the first embodiment.

In the contrast coefficient calculating processor 21, a contrast coefficient "con" for compensating a lowering of a contrast in the expanded image data is obtained. That is, the contrast coefficient is applied to the expanded image data so that a contrast of the expanded image data becomes close to that of the original image data. In the contrast adjusting processor 22, the expanded image data is modified using the contrast coefficient "con".

Since the construction of the image data shown in FIG. 3 is common to the second embodiment, with reference to FIGS. 3, 15A, 15B and 15C, calculations performed in the contrast coefficient calculating processor 21 and a modification of the expanded image data performed in the contrast adjusting processors 22 and 35 are described below.

Figure 15A:
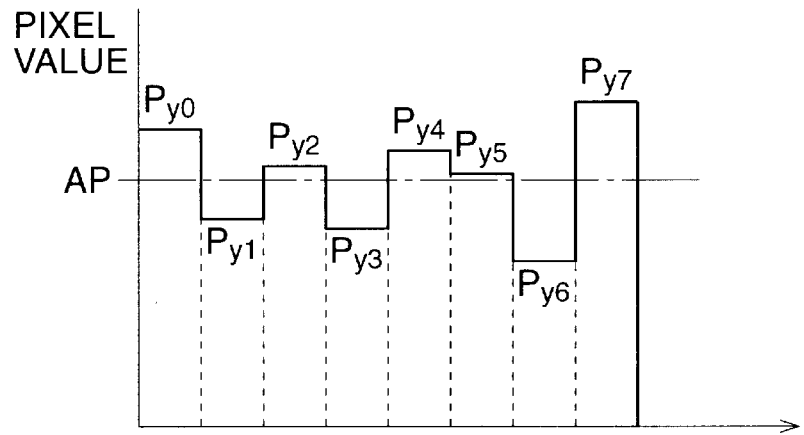
FIGS. 15A, 15B and 15C are views showing examples of pixel values of original image data, expanded image data and intermediate modified expanded image data.
Figure 15B:
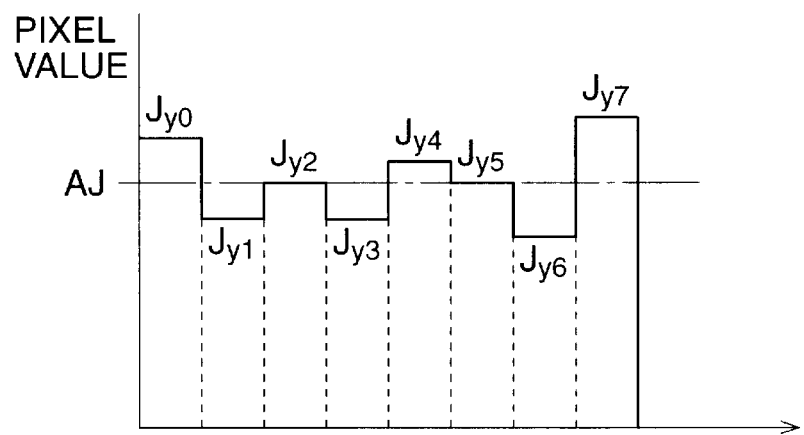
Figure 15C:
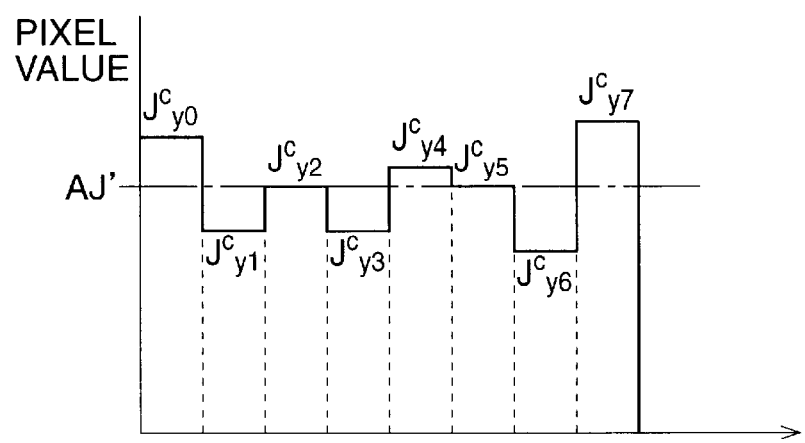

In an 8×8 matrix forming the block B1 of the original image data, it is supposed that 8 pixels arranged in a horizontal line have values of Py0, Py1, Py2, Py3, Py4, Py5, Py6 and Py7 as shown in FIG. 15A, and 8 pixels of the expanded image data, which correspond to the 8 pixels of the original image data, have values of Jy0, Jy1, Jy2, Jy3, Jy4, Jy5, Jy6 and Jy7 as shown in FIG. 15B. Further, it is supposed that the average value of the 8 pixel values Py0, Py1 . . . Py7 of the original image data is AP, and the average value of the 8 pixel values Jy0, Jy1 . . . Jy7 of the expanded image data is AJ.

A part of the data is lost because of processes in the reduced image generator 15 and the first DCT processor 17, and so each of the pixel values of the expanded image data has a different value to that of the original image data. That is, each of the pixel values of the expanded image data is closer to the average value AJ in comparison with the original image data, and thus the variations of the expanded image data are relatively small as a whole. In other words, a contrast of the expanded image data is lower than that of the original image data.

In the contrast coefficient calculating processor 21, a contrast coefficient "con" is obtained in accordance with A formulas (11) through (16) as a modification coefficient, by which a contrast of the expanded image data approaches as close to that of the original image data as possible. In the contrast adjusting processors 22 and 35, using the contrast coefficient "con", a pixel of the expanded image data, which has a greater value than the average value AJ, is modified so as to have a further greater value, and a pixel of the expanded image data, which has a less value than the average value AJ, is modified so as to have a further less value, so that pixel values $J^c y0, J^c y1 \ldots J^c y7$ of intermediate modified expanded image data are obtained.

Prior to the modification, each of the pixel values of the expanded image data is multiplied by a correction coefficient so that the average value AJ of the pixel values of the expanded image data become equal to the average value AP of the pixel values of the original image data. For example, when the average value AP is 1.05 times the average value AJ, each of the pixel values of the expanded image data is multiplied by 1.05 which is the correction coefficient, so that the pixel values of the expanded image data have an average value AJ' (=AP). That is, the average value AJ' of the pixel values $J^c y0, J^c y1 \ldots J^c y7$ (see FIG. 17C) of modified expanded image data is equal to the average value AP of the original image data.

The procedure to obtain the contrast coefficient "con" is described below.

Note that pixels of the third and fourth matrixes M3 and M4 correspond to each other and have the same values, and the contrast coefficient "con" is calculated using the pixel values of the fourth matrix M4. That is, in the calculation of the contrast coefficient "con", the pixel values of the fourth matrix M4 a re used as the expanded image data.

First, in accordance with formula (n), an average value "ave" of the 8×8 pixel values $Y_{yx}$ forming one block of the fourth matrix M4 (expanded image data which is coordinate transformed) is obtained. Then, in accordance with formula (12), an average value "ave" of the 8×8 pixel values forming one block, which is contained in the first matrix (i.e., original image data) and corresponds to the block of the fourth matrix M4 is obtained. Note that, in the following explanation, it is supposed that the block B1 of the first matrix M1 corresponds to the block B4 of the fourth matrix M4.

$$ave' = \frac{1}{64} \sum_{x=s\times 8}^{s\times 8+7} \sum_{y=t\times 8}^{t\times 8+7} J_{yx} \qquad (11)$$

$$ave = \frac{1}{64} \sum_{x=s\times 8}^{s\times 8+7} \sum_{y=t\times 8}^{t\times 8+7} P_{yx} \qquad (12)$$

Then, as described above, the pixel value Jyx is multiplied by the correction coefficient so that the average "ave'" become close to the average value "ave". In the following explanation, the values obtained by being multiplied by the correction coefficients are deemed as the pixel value Jyx. That is, the average value of the 8×8 pixel values Jyx is "ave".

The pixel values $J^c$yx of the intermediate modified expanded image data are defined by formula (13). That is, each of the pixel values $J^c$yx of the intermediate modified expanded image data is obtained by adding the average value "ave" to a modified value (Jyx-ave)×(con) which is the product of the correction coefficient "con" and the difference between the pixel value Jyx and the average "ave".

$$J^c_{yx} = ave + (J_{yx} - ave) \times con \qquad (13)$$

In formula (13), the pixel value $J^c$yx becomes equal to the pixel value Jyx of the expanded image data when con=1, and becomes equal to the average "ave" when con=0. When con>1, in the pixel value $J^c$yx, the contrast is increased relative to the pixel value Jyx of the expanded image data. Thus, by setting the contrast coefficient "con" to the optimum value, modified expanded image data, having pixel values $J^c$yx close to pixel values Pyx of the original image data, can be obtained.

For calculating the modified expanded image data, first, in accordance with formula (14), the sum $E^{(s,t)}$ of the square of the difference between a pixel value of the intermediate modified expanded image data and a pixel value of the original image data is obtained regarding the blocks B1 and B4 of the first and fourth matrixes M1 and M4.

$$E^{s,t} = \sum_{x=s\times 8}^{s\times 8+7} \sum_{y=t\times 8}^{t\times 8+7} (J^c_{yx} - P_{yx})^2 = \qquad (14)$$

$$\sum_{x=s\times 8}^{s\times 8+7} \sum_{y=t\times 8}^{t\times 8+7} ((ave + (J_{yx} - ave) \times con) - P_{yx})^2$$

The sum $E^{(s,t)}$ of the square of the difference has a positive value, and changes in accordance with the value of the contrast coefficient "con". Therefore, by partially differentiating formula (14) by the contrast coefficient "con", and selecting the contrast coefficient "con" so as to have the value 0, the sum $E^{(s,t)}$ becomes the minimum, and the contrast coefficient "con" has the optimum value. That is, the optimum contrast coefficient "con" is obtained in accordance with formulas (15) and (16).

$$\frac{\delta E^{s,t}}{\delta con} = -2\sum_{x=s\times 8}^{s\times 8+7} \sum_{y=t\times 8}^{t\times 8+7} (P_{yx} - ave)(J_{yx} - ave) + \qquad (15)$$

$$2con\sum_{x=s\times 8}^{s\times 8+7} \sum_{y=t\times 8}^{t\times 8+7} (J_{yx} - ave)^2 = 0$$

$$\therefore con = \frac{\sum_{x=s\times 8}^{s\times 8+7} \sum_{y=t\times 8}^{t\times 8+7} (P_{yx} \times J_{yx}) - 64 \times ave^2}{\sum_{x=s\times 8}^{s\times 8+7} \sum_{y=t\times 8}^{t\times 8+7} (J_{yx})^2 - 64 \times ave^2} \qquad (16)$$

The optimum contrast coefficient "con" is used for modifying the pixel values Jyx of the expanded image data in the contrast adjusting processors 22 and 35. That is, the pixel values Jyx of the expanded image data are modified in accordance with formula (13), so that modified expanded image data, having the contrast which is as close to the contrast of the original image data as possible, is obtained.

Figure 16:
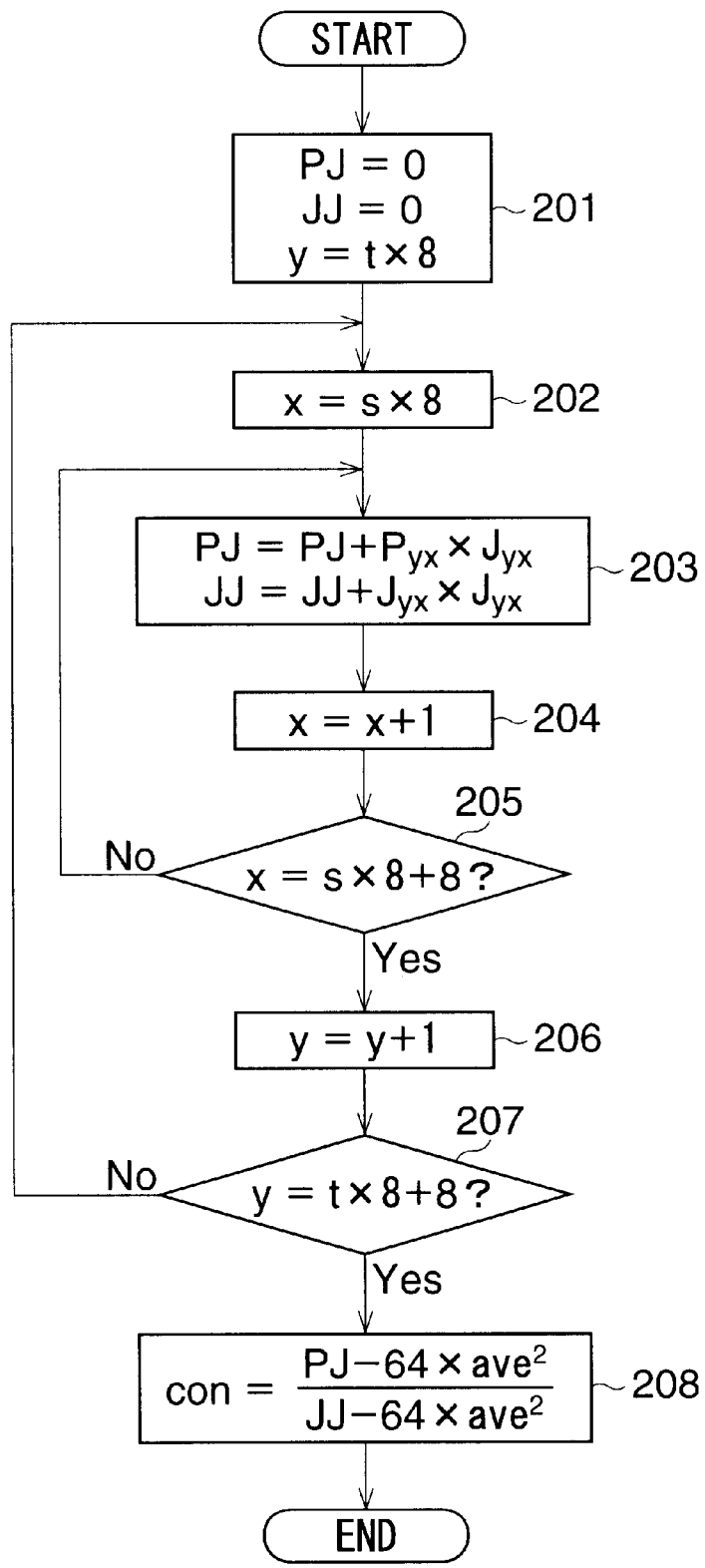
FIG. 16 is a flowchart of a program for obtaining a contrast coefficient.

FIG. 16 is a flowchart of a program which is executed in the contrast coefficient calculating processor 21 to obtain the contrast coefficient "con" in accordance with formula (16).

In Step 201, an initial value of the product PJ of a pixel value Pyx of the original image data and a pixel value Jyx of the expanded image data is set to 0, and an initial value of a square JJ of the pixel value Jyx is set to 0. Further, in Step 201, the ordinate "y" of a pixel positioned at the upper left corner in each of the blocks B1 and B4 of the first and fourth matrixes M1 and M4 is obtained in accordance with the calculation (t×8). In a similar way, in Step 202, the abscissa "x" of the pixel positioned at the upper left corner in each of the blocks B1 and B4 is obtained in accordance with the calculation (s×8).

In Step 203, the product of the pixel value Pyx of the original image data and the pixel value Jyx of the expanded image data is obtained, and is added to the product PJ which is the calculation result in the previous execution of Step 203. Further, in Step 203, a square of the pixel value Jyx is obtained, and is added to the square JJ which is the calculation result in the previous execution of Step 203.

In Step 204, 1 is added to the abscissa "x" of the pixel. In Step 205, it is determined whether the abscissa "x" of the pixel is equal to a value (s×8)+8 in which the pixel is not within each of the blocks B1 and B4. When the abscissa "ax" of the pixel is within each of the blocks B1 and B4, Step 203 is again executed. Conversely, when the abscissa "x" is not within each of the blocks B1 and B4, Step 206 is executed in which 1 is added to the ordinate "y" of the pixel, and Step 207 is then executed in which it is determined whether the ordinate "y" of the pixel is equal to a value (t×8)+8 in which the pixel is not within each of the blocks B1 and B4. When the ordinate "y" of the pixel is within each of the blocks B1 and B4, when the ordinate "y" of the pixel is within each of the blocks B1 and B4, the routine goes back to Step 202, so that the abscissa "x" is reset to the initial value (s×8). Then, the loop composed of Steps 203, 204 and 205 is again executed.

Thus, the product sum PJ and the square sum JJ are obtained regarding 8×8 pixels forming each of the blocks B1 and B4. Then, Step 208 is executed in which the contrast coefficient "con" is calculated in accordance with formula (16), and this program ends.

Figure 17:
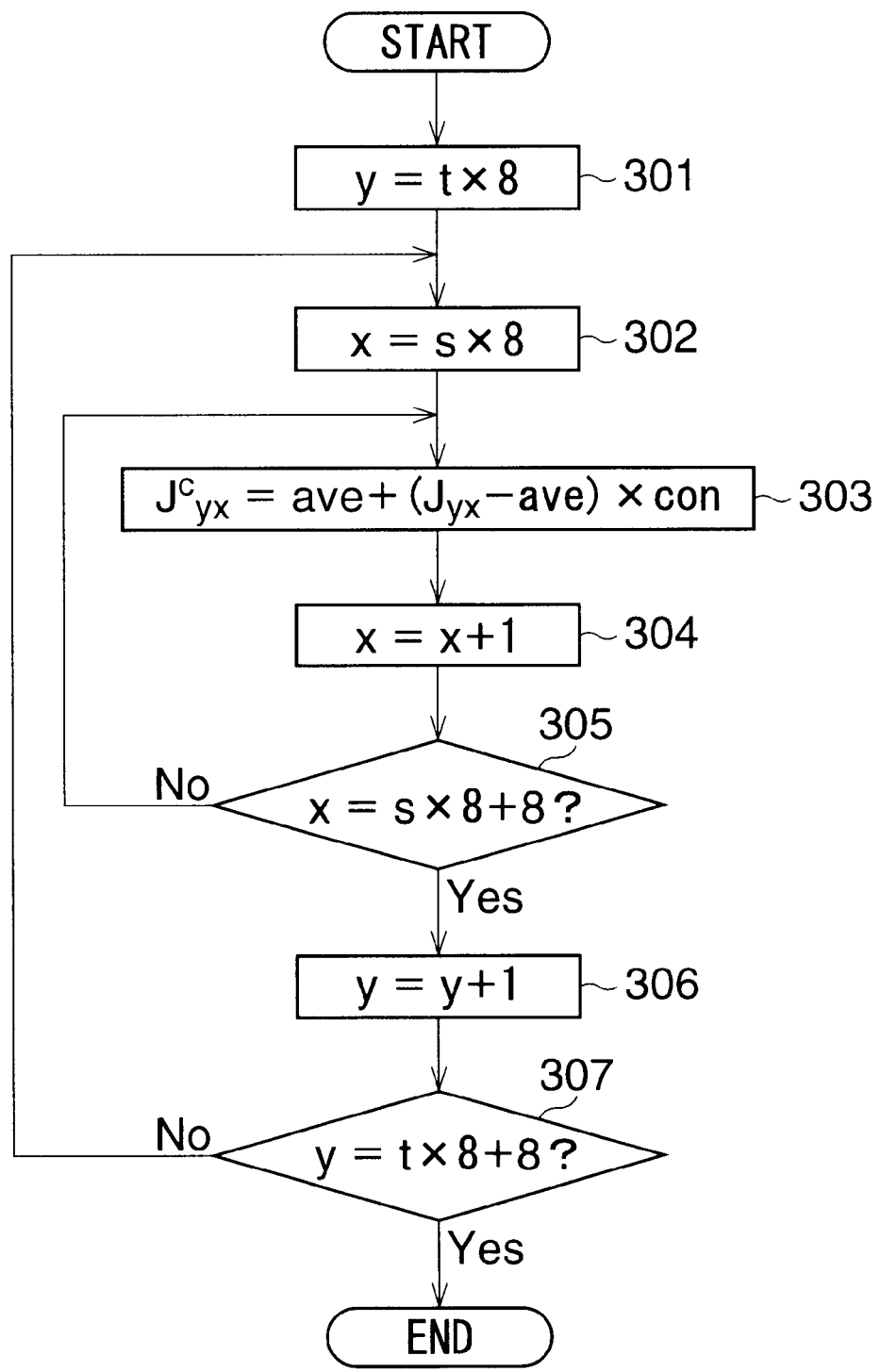
FIG. 17 is a flowchart of a program for obtaining pixel values of modified expanded image data.

FIG. 17 is a flowchart of a program which is executed in the contrast adjusting processors 22 and 35 to obtain the pixel values $J^c yx$ of the modified expanded image data in accordance with formula (13).

In Step 301, the ordinate "y" of the pixel positioned at the upper left corner in each of the blocks B1 and B4 of the first and fourth matrixes M1 and M4 is obtained in accordance with the calculation (t×8). In a similar way, in Step 302, the abscissa "x" of the pixel positioned at the upper left corner in each of the blocks B1 and B4 is obtained in accordance with the calculation (s×8). In Step 303, the pixel values $J^c yx$ of the modified expanded image data are calculated in accordance with formula (13).

In Step 304, 1 is added to the abscissa "x" of the pixel. In Step 305, it is determined whether the abscissa "x" of the pixel is equal to a value (s×8)+8 in which the pixel is not within each of the blocks B1 and B4. When the abscissa "x" of the pixel is within each of the blocks B1 and B4, Step 303 is again executed. Conversely, when the abscissa "x" is not within each of the blocks B1 and B4, Step 306 is executed in which 1 is added to the ordinate "y" of the pixel, and Step 307 is then executed in which it is determined whether the ordinate "y" of the pixel is equal to a value (t×8)+8 in which the pixel is not within each of the blocks B1 and B4. When the ordinate "y" of the pixel is within each of the blocks B1 and B4, the routine goes back to Step 302, so that the abscissa "x" is reset to the initial value (s×8). Then, the loop composed of Steps 303, 304 and 305 is again executed.

Thus, when Step 303 is executed for all of 8×8 pixels forming each of the blocks B1 and B4, this program ends.

In the evaluation function calculating processor 19, the evaluation function value is calculated based on the difference between each of the pixel values of the original image data corresponding to the reduced image area set in the reduced image area setting processor 16 and each of the pixel values of the modified expanded image data obtained in the contrast adjusting processor 22. The calculation of the evaluation function is the same as that of the first embodiment. After completion of the calculation of the evaluation function value in the evaluation function calculating processor 19, the next reduced image area is set in the reduced image area setting processor 16. Then, processes are performed in the DCT processor 17, the expanded IDCT processor 18, the contrast coefficient calculating processor 21 and the contrast adjusting processor 22 in this order, and the evaluation function value of the next reduced image area is then calculated in the evaluation function calculating processor 19.

FIGS. 18A through 18D correspond to FIGS. 10A through 10D of the first embodiment, and show a single block of the modified expanded image data, respectively, the original image data corresponding to the modified expanded image data being the same as that of the first embodiment. As can be understood from a comparison with the expanded image data of the first embodiment (FIGS. 10A through 10D), according to the second embodiment, due to the provision of the contrast coefficient calculating processor 21 and the contrast adjusting processors 22 and 35, there is a tendency in which a pixel having a relatively high contrast is modified to a higher contrast pixel, and a pixel having a relatively low contrast is modified to a lower contrast pixel.

FIG. 19 corresponds to FIG. 11 of the first embodiment, and shows an example of the contrast coefficients and the evaluation function values, in a case in which the reduced image area is displaced in the horizontal direction and the vertical direction by predetermined amounts relative to the second matrix M2. In this example, the evaluation function value of the shift (q,r)=(−7,−3) is the minimum, and the corresponding contrast function is 1.103. As can be understood from a comparison with FIG. 11, the evaluation function value becomes small due to the application of the contrast coefficient.

The contrast coefficient "con" and the displacement direction and amount of the reduced image area, by which the evaluation function value becomes a minimum, are changed for each of the 8×8 pixel block, and are recorded in the recording medium RM, together with the parameter "mm" indicating the displacement direction and amount, similarly to the first embodiment.

As described above, according to the second embodiment, in addition to the effects obtained by the first embodiment, an image can be reproduced, which is closer to the original image than one reproduced by the device of the first embodiment, due to the application of the contrast coefficient "con".

While the invention has been described with reference to specific embodiment chosen for purpose of illustration, it should be apparent that numerous modifications could be made thereto by those skilled in the art without departing from the basic concept and scope of the invention.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-62363 (filed on Mar. 9, 1999) which is expressly incorporated herein, by reference, in its entirety.

What is claimed is:

1. An image compression apparatus comprising:
   a reduced image generating processor that generates, based on original image data arranged in a first matrix comprised of a plurality of pixels, reduced image data arranged in a second matrix comprised of a smaller number of pixels than said first matrix;
   a reduced image area setting processor that sets a reduced image area, which is defined by a sub-matrix, obtained by displacing said second matrix in a predetermined displacement direction by a predetermined amount, and contains an objective pixel also contained in said reduced image data;
   a first orthogonal transforming processor that applies orthogonal transformation to said reduced image data of said reduced image area to obtain reduced orthogonal transformation coefficient data;
   a first expanded image generating processor that applies inverse orthogonal transformation to said reduced orthogonal transformation coefficient data to obtain expanded image data arranged in a third matrix comprised of a greater number of pixels than said second matrix;
   an evaluation function calculating processor that calculates a value of an evaluation function, which corresponds to a difference between said original image data and said expanded image data; and
   a displacement-amount selecting processor that selects said displacement direction and amount of said reduced image area, for every said objective pixel, in such a manner that said value of said evaluation function becomes a minimum.

2. The image compression apparatus according to claim 1, further comprising a recording processor that records said reduced image data, and a parameter which is selected by said displacement-amount selecting processor and indicates said displacement direction and amount, in a recording medium.

3. An image expansion apparatus for expanding said reduced image data recorded in said recording medium by said image compression apparatus described in claim 2, said image expansion apparatus comprising:

a data reading processor that reads said parameter and said reduced image data from said recording medium;

a reduced image area selecting processor that selects a reduced image area based on said displacement direction and amount, corresponding to said objective pixel included in said reduced image data;

a second orthogonal transforming processor that applies said orthogonal transformation to said reduced image data of said reduced image area selected by said reduced image area selecting processor, for every said objective pixel, to obtain reduced orthogonal transformation coefficient data; and a second expanded image generating processor that applies inverse orthogonal transformation to said reduced orthogonal transformation coefficient data to obtain expanded image data arranged in the third matrix composed of said a greater number of pixels than said second matrix.

4. The image compression apparatus according to claim 1, wherein said reduced image generating processor obtains an average value of a predetermined number of pixel values included in said first matrix, and sets said average value as one pixel value corresponding to a predetermined number of pixels included in said second matrix.

5. The image compression apparatus according to claim 4, wherein said average value is obtained from 8×8 pixel values included in said first matrix.

6. The image compression apparatus according to claim 1, wherein said first matrix is comprised of 64×64 pixels and said second matrix is comprised of 8×8 pixels.

7. The image compression apparatus according to claim 1, wherein said orthogonal transformation is a two dimensional discrete cosine transformation and said inverse orthogonal transformation is a two dimensional inverse discrete cosine transformation.

8. The image compression apparatus according to claim 7, wherein said first, second, and third matrixes are comprised of 64×64, 8×8, and 64×64 pixels, respectively, and said first expanded image generating processor obtains said expanded image data by a two dimensional inverse discrete cosine transformation expressed by the following formula:

$$I'^{(s,t,q,r)}_{yx} = \frac{1}{4}\sum_{u=0}^{7}\sum_{v=0}^{7} CuCvD^{(s,t,q,r)}_{vu} \cdot \cos\frac{(2x+1)u\pi}{128}\cos\frac{(2y+1)v\pi}{128}$$

wherein, $0 \leq x \leq 63$, $0 \leq y \leq 63$, $I'^{(s,t,q,r)}_{yx}$ is the pixel value of said expanded image data, $Cu$, $Cv = \frac{1}{2}^{1/2}$ when $u$, $v=0$, $Cu$, $Cv=1$ when $u$, $v \neq 0$, and $D^{(s,t,q,r)}_{vu}$ is a DCT coefficient obtained by said two dimensional discrete cosine transformation.

9. The image compression apparatus according to claim 1, further comprising a coordinate transforming processor that transforms a coordinate system of pixels of said third matrix to a coordinate system of pixels of said original image data, to generate a fourth matrix.

10. The image compression apparatus according to claim 9, wherein said evaluation function calculating processor calculates a sum of a square of the difference between a first pixel value included in said first matrix and a second pixel value included in said fourth matrix and corresponding to said first pixel value, to obtain said value of said evaluation function.

11. The image compression apparatus according to claim 9, wherein said value of said evaluation function corresponds to the difference between said reduced image data of said reduced image area and modified expanded image data, which is obtained in such a manner that a contrast of said expanded image data becomes close to a contrast of said original image data.

12. An image compression apparatus comprising:

a reduced image generating processor that generates, based on original image data arranged in a first matrix comprised of a plurality of pixels, reduced image data arranged in a second matrix comprised of a smaller number of pixels than said first matrix;

a reduced image area setting processor that sets a reduced image area, which is defined by a sub-matrix, obtained by displacing said second matrix in a predetermined displacement direction, and contains an objective pixel also contained in said reduced image data;

a first orthogonal transforming processor that applies orthogonal transformation to said reduced image data to obtain reduced orthogonal transformation coefficient data;

a first expanded image generating processor that applies inverse orthogonal transformation to said reduced orthogonal transformation coefficient data to obtain expanded image data arranged in a third matrix comprised of a greater number of pixels than said second matrix;

a contrast coefficient calculating processor that obtains a contrast coefficient in such a manner that a contrast of said expanded image data becomes close to a contrast of said original image data by applying said contrast coefficient to said expanded image data;

a contrast adjusting processor that applies said contrast coefficient to said expanded image data to modify said expanded image data whereby modified expanded image data is obtained;

an error evaluation function calculating processor that calculates a value of an error evaluation function, which corresponds to a difference between said original image data and said modified expanded image data; and a displacement-amount selecting processor that selects said displacement direction and amount of said reduced image area, for every said objective pixel, in such a manner that said value of said error evaluation function becomes a minimum.

13. The image compression apparatus according to claim 12, further comprising a recording processor that records said reduced image data, said contrast coefficient, and a parameter which is selected by said displacement-amount selecting processor and indicates said displacement direction and amount, in a recording medium.

14. An image expansion apparatus for expanding said reduced image data recorded in said recording medium by said image compression apparatus described in claim 13, said image expansion apparatus comprising:

a data reading processor that reads said parameter, said contrast coefficient and said reduced image data from said recording medium;

a reduced image area selecting processor that selects a reduced image area based on said displacement direction and amount, corresponding to said objective pixel included in said reduced image data;

a second orthogonal transforming processor that applies said orthogonal transformation to said reduced image data of said reduced image area selected by said reduced image area selecting processor, for every said objective pixel, to obtain reduced orthogonal transformation coefficient data;

a second expanded image generating processor that applies inverse orthogonal transformation to said reduced orthogonal transformation coefficient data to obtain expanded image data arranged in the a third matrix comprised of said a greater number of pixels than said second matrix; and a contrast adjusting processor that applies said contrast coefficient to said expanded image data to modify said expanded image data whereby modified expanded image data is obtained.

* * * * *